US012250253B2

(12) United States Patent
Rubery et al.

(10) Patent No.: US 12,250,253 B2
(45) Date of Patent: Mar. 11, 2025

(54) USER LOCATION-BASED COLLABORATION

(71) Applicant: Zoom Video Communications, Inc., San Jose, CA (US)

(72) Inventors: Dennis Paul Rubery, Pittsford, NY (US); Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/977,637

(22) Filed: Oct. 31, 2022

(65) Prior Publication Data

US 2024/0146778 A1 May 2, 2024

(51) Int. Cl.
*H04L 65/1093* (2022.01)
*H04L 65/403* (2022.01)
*H04L 67/52* (2022.01)
*H04W 4/029* (2018.01)

(52) U.S. Cl.
CPC ........ *H04L 65/1093* (2013.01); *H04L 65/403* (2013.01); *H04L 67/52* (2022.05); *H04W 4/029* (2018.02)

(58) Field of Classification Search
None
See application file for complete search history.

(56) References Cited

U.S. PATENT DOCUMENTS

| 9,342,976 | B2 | 5/2016 | Pfeffer |
| 2008/0318564 | A1 | 12/2008 | Kreiner et al. |
| 2010/0037151 | A1 | 2/2010 | Ackerman et al. |
| 2015/0039760 | A1 | 2/2015 | Yoakum |
| 2015/0204109 | A1 | 7/2015 | Ergenbright |
| 2016/0192166 | A1* | 6/2016 | deCharms ............... H04N 7/148 348/14.02 |
| 2017/0169699 | A1 | 6/2017 | Will et al. |
| 2018/0084100 | A1 | 3/2018 | Chockalingam |
| 2020/0242718 | A1 | 7/2020 | Owens et al. |

(Continued)

OTHER PUBLICATIONS

JPH07298241A "Video Conference Equipment Having Remote Monitor Function", Google Patents, Kyocera Corp. 4 pages.

(Continued)

*Primary Examiner* — June Sison
(74) *Attorney, Agent, or Firm* — Kilpatrick Townsend & Stockton LLP

(57) ABSTRACT

Systems and methods for providing user location-based collaboration are provided herein. In an aspect, a method includes receiving, by a video conference provider, a request to initiate an incident response system and establishing, by the video conference provider, an incident response session with the incident response system. The method may also include determining, by the video conference provider, a location associated with the incident response system and determining, by the video conference provider, client devices within a predetermined vicinity of the location. The method may also include transmitting, by the video conference provider, a request to one or more of the client devices to join the incident response session. In an example, the request to initiate an incident response system may be from an administrator of a facility where an incident event has occurred.

20 Claims, 16 Drawing Sheets

(56) References Cited

U.S. PATENT DOCUMENTS

2020/0322038 A1* 10/2020 Mills ................. H04L 65/1089
2021/0037368 A1*  2/2021 Pellegrini ......... H04M 1/72418
2021/0048829 A1   2/2021 Deyle et al.
2023/0144781 A1   5/2023 Han
2024/0146777 A1   5/2024 Rubery et al.
2024/0146785 A1   5/2024 Rubery

OTHER PUBLICATIONS

U.S. Appl. No. 17/977,611, filed Oct. 31, 2021.
U.S. Appl. No. 17/977,623, filed Oct. 31, 2021.
U.S. Appl. No. 17/977,611, "Non-Final Office Action", dated Aug. 23, 2023, 11 pages.
U.S. Appl. No. 17/977,623, "Non-Final Office Action", dated Jul. 7, 2023, 13 pages.
JPH07298241A , "Video Conference Equipment Having Remote Monitor Function", Google Patents, Kyocera Corp, Oct. 11, 1995, 4 pages.
"Use Zoom for the Incident Command Center", Posted at https://web.archive.org/web/20210411102951/https://support.atlassian.com/opsgenie/docs/use-zoom-for-the-incident-command-center/, Apr. 11, 2021.
U.S. Appl. No. 17/977,611 , "Final Office Action", Mar. 25, 2024, 13 pages.
U.S. Appl. No. 17/977,623 , "Final Office Action", Apr. 17, 2024, 14 pages.
U.S. Appl. No. 17/977,611 , "Non-Final Office Action", Aug. 14, 2024, 16 pages.
U.S. Appl. No. 17/977,623 , "Non-Final Office Action", Aug. 8, 2024, 15 pages.

* cited by examiner

USER LOCATION-BASED COLLABORATION

CROSS-REFERENCE TO RELATED APPLICATIONS

This application is related to co-pending U.S. patent application Ser. No. 17/977,611, filed Oct. 31, 2022, titled "General Incident Response System," and to co-pending U.S. patent application Ser. No. 17/977,623, filed Oct. 31, 2022, titled "First Response System."

FIELD

The present application generally relates to videoconferences and more particularly relates to systems and methods for providing an incident response system. In some aspects, the present application relates to systems and methods for providing first responder system access. In still further aspects, the present application relates to systems and methods for providing user location-based collaboration.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
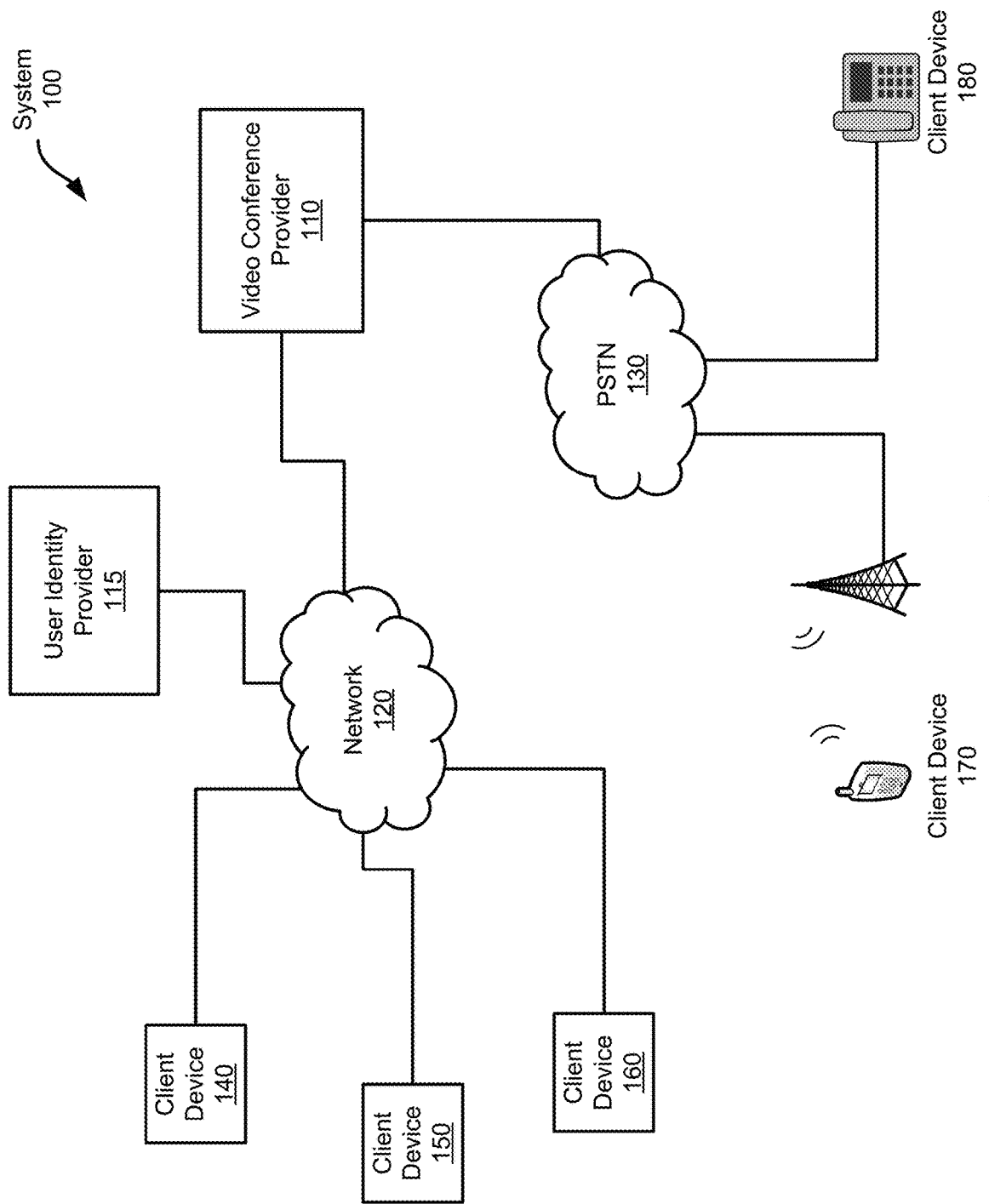
FIGS. 1, 2, and 3 show example systems for providing an incident response system, according to an embodiment herein.

Examples are described herein in the context of systems and methods for providing an incident response system, providing authorized agency system access, and providing user location-based collaboration. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Recent tragic events highlight the limits of first responder accessibility. As other areas of modern daily life become increasingly virtual and connected, many facilities and venues remain isolated and inaccessible via virtual means to first responders and aid. That is, incidents in facilities, whether the facility be places of worship, schools, universities, or businesses, present unique communication and situational awareness challenges to officials and first responders. Even when a facility has a dedicated security system, it may be difficult to access for officials and first responders, can have limited distribution capabilities, and rarely permits two-way communication between individuals outside of the facility and those inside.

A common problem for current security systems is that communications are often routed back to a central console or location, such as a locked room. Having a central console for security systems can be problematic in that the room housing the central console often is inadequately sized for a response team. Even if the security system allows for remote access, it is often difficult or impossible to grant access to officials and first responders during an incident. These access issues can be exacerbated during multi-agency responses, creating significant command and control challenges.

The above identified issues of present-day security systems often leave officials calling random phones within a facility hoping someone will answer, shouting down hallways, or using public address (PA) systems in the hopes of engaging the appropriate individuals within the facility. All of these issues result in slow and often insufficient response efforts by officials and first responders, which can lead to increased danger to individuals involved in an emergency incident (hereinafter an "incident").

To facilitate remote and dispersed access to officials and first responders that provides increased visibility and connectedness within a facility, systems and methods for an incident response system are provided herein. Modern collaboration platforms, such as video conference platforms, aggregate and route numerous multimedia streams seamlessly to any connected endpoints, whether fixed or mobile. For example, video conference providers can enable people to interact with each other using their own computers (or "client devices") with both video and audio in a variety of settings, such as in one-on-one conversations, group meetings, and webinars. As described in greater detail with respect to the example systems and methods provided herein, the structure provided by video conference providers can be leveraged to provide officials and first responders dispersed and remote access to facilities, including the ability to gain visual and audio access within a facility and participate in two-way communication with individuals of interest within the facility.

According to one embodiment, an incident response system is provided. The incident response system can utilize client devices distributed within a facility, including people's laptops at workstations, conference rooms, and personal devices. If the client device is enrolled in an incident response system, then the client device may be requested to join the incident response session in the event of an incident. Upon joining an incident response session, the client device may be utilized to collect audiovisual content. This can allow officials and first responders to utilize the client device in an emergency situation to gather vital information regarding the vicinity around the client device. The content collected from the client device, and other client devices throughout the facility, can provide officials and first responders numerous streams at one time, thereby providing increased visibility to the incident. Moreover, when the client device is joined to the incident response session, officials and first responders may be able to engage in communication with any individuals within the vicinity of the client device. For example, officials can speak to an individual trapped in a room due to a natural disaster, providing the individual instructions on safe routes for rescue.

Importantly, example incident response systems provided herein can allow multiple officials and first responders to join an incident response system simultaneously without physical restraints of room capacity. Moreover, officials and first responders who are remote from the incident event can be joined and access live streams from the incident event. This can allow for any number of response teams to be utilized in response to an incident and responders and officials from any location can be joined to aid in the response effort.

To accommodate the various response strategies that may be implemented in response to an incident, breakout rooms can be created within an incident response session to address the various tactics required for a given response. For example, a first breakout room may be created for a search and rescue team, a second breakout room may be created for a medical response team, and a third breakout room may be created for monitoring of incoming video and audio streams from the client devices within the facility. As will be described in greater detail below, each of these breakout rooms may have its own organization of incoming communication from client devices as well as from other responders.

To provide officials and first responders swift and secure access to an incident response system, methods and systems for authorized agency system access are provided herein. According to an embodiment, an authorized agency system access described herein can provide for a mechanism to grant ad-hoc approval for officials and first responders to access an incident response system, including the audiovisual streams available from client devices within an incident response session. Upon accessing and joining an incident response session, officials and first responders can be provided with audio and video streams received from client devices associated with the incident response system.

To provide security and safety to an incident response system and any resulting incident response session, the authorized agency system access may limit access to agency devices coming from first responder or official specific networks. For example, access to an incident response session may be limited to AT&T's™ FirstNet network or access may be limited to an internal safety team within the video conference provider's network.

Beyond providing officials and first responders access to the incident response system, example authorized agency system access provided herein can determine an appropriate agency to join to an incident response session based on location or the type of incident event. For example, if the incident event is a fire, then the authorized agency system access may determine firefighters are the appropriate officials to engage in the incident response session. Based on this determination, the authorized agency system access may contact or otherwise join an agency associated with the local firefighters to an incident response system.

Another problem created by current security systems is that only endpoint devices that are officially part of the security system can be used for security purposes. Advantageously, example incident response systems provided herein can allow for user location-based collaboration. According to one embodiment, if an incident event is determined and an incident response session is established, the incident response system may monitor for client devices within a predetermined vicinity of the incident event. For example, the incident response system may determine that a client device that is not part of the incident response system, such as a visitor to the facility, is within a predetermined vicinity of the incident event. Based on the vicinity of the client device to the incident event, the incident response system may transmit a request to the client device to join the incident response session. Not only can this provide officials and first responders relevant audio and video streams near the incident event but it can allow officials and first responders to contact the individual near the incident event. This can allow officials and first responders to provide safety instructions or aid to the individual near the incident event.

This illustrative example is given to introduce the reader to the general subject matter discussed herein and the disclosure is not limited to this example. The following sections describe various additional non-limiting examples and examples of systems and methods for providing an incident response system, providing authorized agency system access, and providing user location-based collaboration.

Referring now to FIG. 1, FIG. 1 shows an example system 100 that provides video conferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
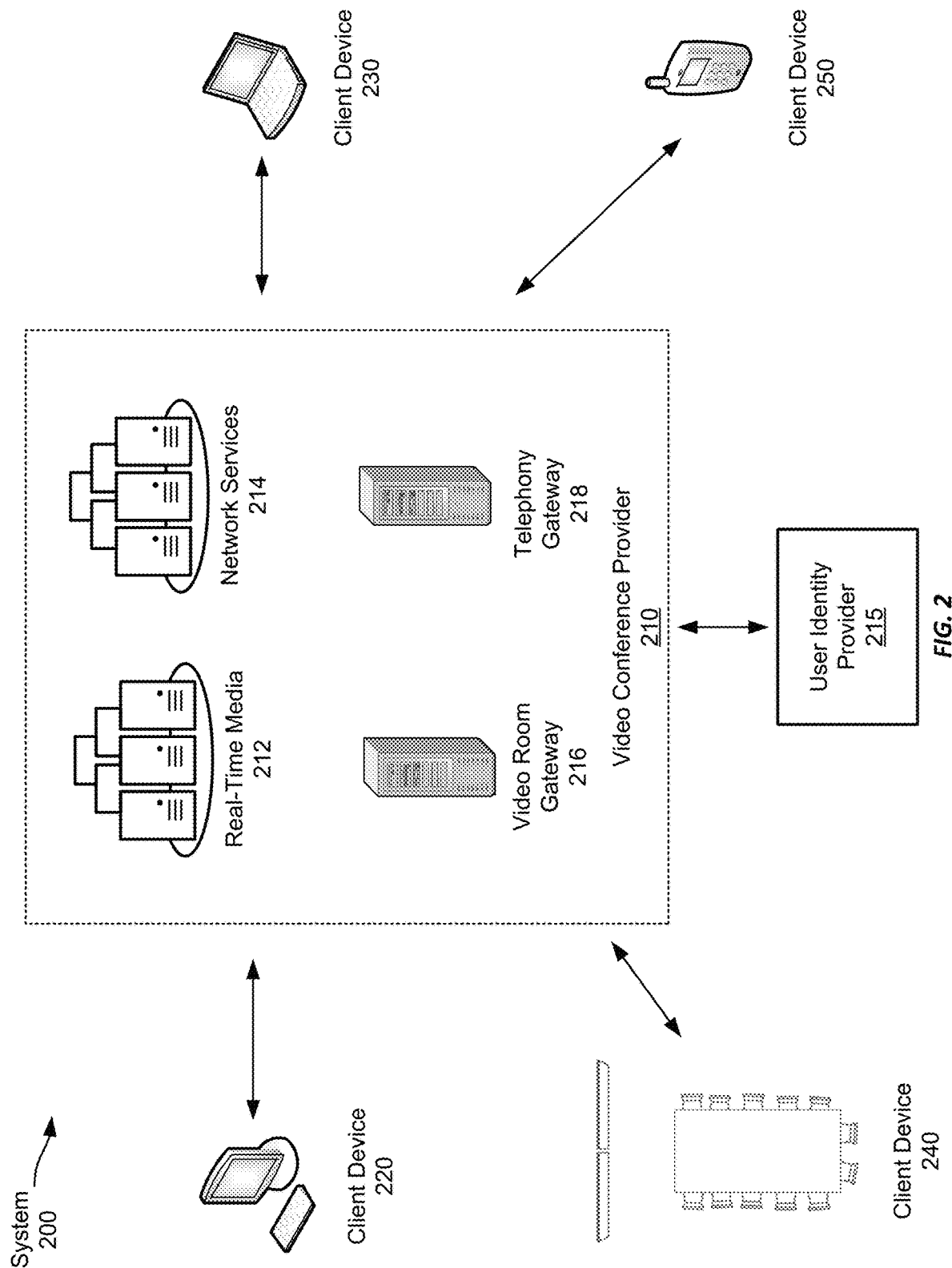

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host. In some embodiments, a barcode or QR code may be generated to expediate sharing of a meeting invitation or the record for the meeting.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides video conferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosted by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
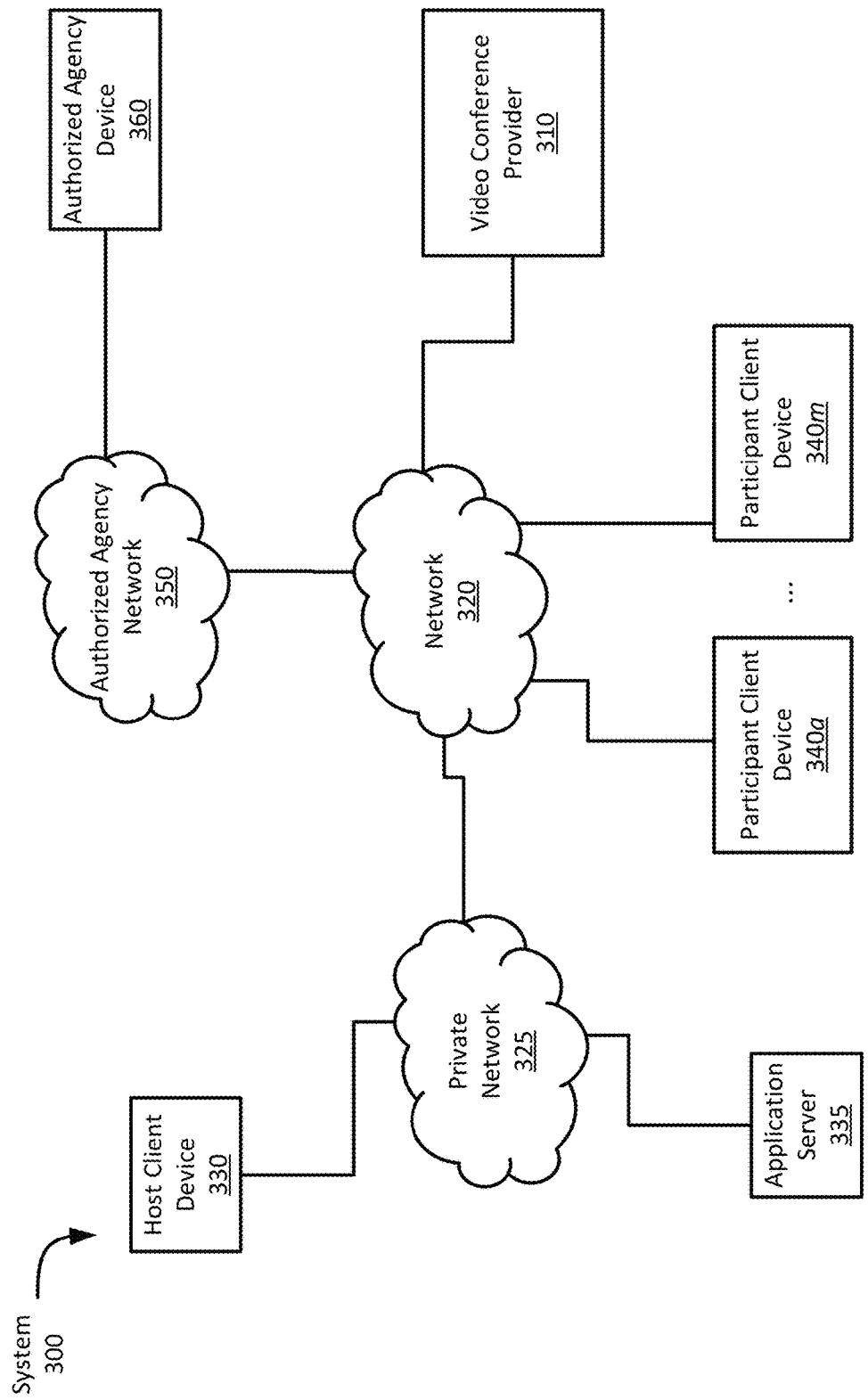

Referring now to FIG. 3, FIG. 3 shows an example system 300 for providing an incident response system, according to an embodiment herein. The example system 300 may also be used to provide authorized agency system access, according to some embodiments. In still further embodiments, the example system 300 may be used to provide user location-based collaboration.

As illustrated, a video conference provider 310 provides video conference services to multiple different client devices 330 and 340a-m, generally as described above with respect to FIGS. 1 and 2. In this example, the client devices 330 and 340a-m participate in a meeting hosted by the video conference provider 310. Client devices 340a-m connect to the video conference provider 310 over a public network 320, e.g., the internet; however, host client device 330 participates from within a private network 325, such as from their office at work. In addition to the host client device 330, an application server 335 is connected to the private network and makes various business applications available to the host client device 330. In different examples, these business applications may vary; however, in this example, the application server 335 provides applications to access business databases and files. To access these various resources, the host client device 330 has different client applications installed on it and may also have web applications accessible via a web browser, which may be stored as bookmarks in the web browser.

To start a meeting, the host client device 330 connects to the video conference provider 310 and begins a virtual meeting ("meeting") at the video conference provider 310, such as by beginning a scheduled meeting, generally as described above with respect to FIGS. 1 and 2. The video conference provider 310 may create and manage the meeting as discussed above.

Once the virtual meeting is started, participants may be able to interact with other participants and see their respective names, such as in close proximity to other participants' video streams or in a list of participants visible in a graphical user interface ("GUI"). In some embodiments, the participants may only be able to see information, e.g., names or video feeds, from the host(s) of the meeting or certain select participants that will be engaged in discussions during the virtual meeting, such as panelists in a panel discussion. Still other limits may be imposed on the various participants, such as their ability to react to occurrences during the meeting, e.g., participants may be allowed to interact with their GUI to raise their hand to ask a question, but may not be allowed to provide any other feedback.

During the meeting one of the participant client devices 340a-m or the host client device 330 may request to record the meeting. The request to record the meeting may be transmitted to the video conference provider 310. In some embodiments, the video conference provider 310 may prompt the non-requesting client devices with a notification that the meeting is going to be recorded. For example, if the host client device 330 request to record the meeting, the participant client devices 340a-m may receive a notification that the meeting is going to be recorded. Once the meeting request is accepted, the video conference provider 310 may record the audio and video streams from all of the client devices, 340a-m and 330, until the recording is terminated or the meeting is ended.

In some embodiments, instead of hosting a virtual meeting, the video conference provider 310 may be requested to initiate an incident response system. As will be described in greater detail with respect to FIGS. 4-6, an incident response system may be formed by client devices in communication with the video conference provider 310. For example, the client devices 340a-340m may be used to form an incident response system. In some embodiments, the incident response system may be formed by client devices within a facility, within a specific location, such as a university campus, or within a specific region, such as Fort Meyers, Florida.

To be part of an incident response system, the client device, such as the client device 340a, may receive a request to join the incident response system. The request may be provided to the client device upon installation of software associated with video conference provider 310. For example, upon joining a virtual meeting hosted by the video conference provider 310 for the first time, the client device may receive a request to allow the client device to be part of an incident response system in the event of an emergency incident. If the request is accepted, then the client device may be used to form an incident response system, or part of such a system, in the event of an incident.

As noted above, an incident response system may only be activated in the event of an incident. An incident event may include any variety of emergency or emergent situations, such as natural disasters, fires, unauthorized persons, unruly visitors, or any other events that pose risk of harm to individuals within the facility. An incident event is typically initiated/identified by an individual within the facility (such as the pulling of a fire alarm by a student or pressing an incident button by an admin). However, an incident event may also be automatically triggered (such as by a smoke alarm or other sensor used to passively monitor an area for potential emergencies).

Once an incident event (also referred to herein as an "incident") is identified, a request may be sent to the video conference provider 310 to activate an incident response system. Upon receiving the request, the video conference provider 310 may transmit a request to the client devices 340a-340m, and the client device 330 to join an incident response session.

The incident response session may be the same or similar to a virtual meeting hosted by the video conference provider 310. For example, the video conference provider 310 may receive one or more multimedia streams from each of the client devices 340a-340m and the client device 330 that join the incident response session. A key difference, however, between a conventional virtual meeting and an incident response session is that any client devices 340a-340m or client device 330 that is available may be automatically joined to the incident response session. That is, if a client device, such as the client device 340a, is in a powered-on state, and previously accepted to be part of the incident response system, then the video conference provider 310 may automatically join the client device 340a to the incident response session without any input from the client device 340a. If the client device did not previously accept to be part of the incident response system, then the video conference provider 310 may transmit a request for the client device to join the incident response system, and thereafter be joined to the incident response session, such as following approval by a user of the client device. The request to join the incident response system, regardless of the timing (e.g., prior to an incident event or during an incident event) may require input from a user of the receiving client device.

Once a client device, such as the client device 340a, is joined to the incident response session, the video conference provider 310 may gain control of any multimedia stream transmissions to and from the client device 340a. Specifically, the video conference provider 310 may gain access to and control over equipment on the client device 340a for generating and transmitting an audio stream, a video stream, or a messaging stream to and from the client device 340a. As will be described in greater detail below, this can allow for an authorized agency (e.g., officials and first responders) to use the client device 340a to gather information regarding an incident within the vicinity of the client device 340a. For example, the authorized agency can receive a video stream from the client device 340a of the area around the client device 340a or the authorized agency can send a message to individuals within the vicinity of the client device 340a.

An authorized agency device may also be joined to the incident response session to assist in the response to the identified incident event. For example, upon determination of an incident event and initiation of the incident response session, the video conference provider 310 may communicate with an authorized agency network 350 to join an authorized agency device to the incident response session. Importantly, the authorized agency network 350 may not be contacted until authorization is received from the incident response system. For example, on-site security, management, or authorized personnel from the facility may be part of the incident response system and may review an incident event to determine whether the authorized agency network 350 should be contacted. If the on-site security determines that the incident event requires assistance from authorities or first responders, then a request to join the incident response session may be transmitted to the authorized agency network 350.

In some embodiments, the video conference provider 310 may determine an appropriate authorized agency network 350 to contact. In an example embodiment, the video conference provider 310 may determine an appropriate authorized agency network 350 based on the location of the incident event, the type of incident event, or based on protocols established by the facility in which the incident event is occurring. For example, if the incident event is a hurricane that is endangering the facility, and the individuals therein, the video conference provider 310 may determine that the Federal Emergency Management Agency (FEMA) is an appropriate authorized agency network 350 to contact. In another example, if the incident event is an unauthorized person that has entered the facility, the video conference provider 310 may determine that the local first responder station is the appropriate authorized agency network 350 to contact. In some embodiments, instead of the video conference provider 310 making this determination, a third party may make this determination.

In some embodiments, instead of determining an appropriate authorized agency network 350 to contact, the video conference provider 310 may contact the authorized agency network 350 and the authorized agency network 350 may make the determination of an appropriate authorized agency device 360 to engage. That is, the authorized agency device 350, based on information provided by the video conference provider 310 may make the determination of what authorized agency device 360 to contact and join to the incident response session. The determination may be based on the same information as noted above, such as the location of the incident event, type of incident event, or the procedures of the facility in which the incident event is occurring.

To provide secure access to the client devices 340a-m and client device 330, the authorized agency network 350 may be a first responder specific network. For example, the authorized agency network 350 may include or be similar to AT&T's™ FirstNet network. In another example, the authorized agency network 350 may include an internal safety team within the facility or within the video conference provider 310's network. Any connection established during an incident response session would not be accessible to the public without proper authentication through either the video conference provider 310 or the authorized agency network 350.

Once the authorized agency network 350 is contacted by the video conference provider 310, an authorized agency device 360 may be joined to the incident response session. It should be understood that although for the following examples the authorized agency device 360 is described as singular, any number of authorized agency devices 360 may be joined to the incident response session. The authorized agency device 360 may be any client device used by an authorized agency to connect to the authorized agency network 350.

Upon joining the authorized agency device 360 to the incident response session, the video conference provider 310 may grant the authorized agency device 360 host controls over the incident response session. Host controls for an incident response session may include standard host controls and abilities as well as the ability of the authorized agency device 360 to control equipment of any client device joined to the incident response session used to generate a multimedia stream. Example equipment include a client device's microphone, camera, speaker, and, in some cases, messaging applications.

During an incident response session, the authorized agency device 360 may access and control equipment of a client device, such as the client device 340*a*, to access the area around the client device 340*a*. For example, the authorized agency device 360 may activate a microphone and a camera of the client device 340*a* such to receive an audio stream and a video stream from the client device 340*a*. In another example, the authorized agency device 360 may transmit a message to the client device 340*a* via a speaker on the client device 340*a* or may transmit a chat message to the client device 340*a* via a display on the client device 340*a*. Once the client device 340*a* joins the incident response session, thereby granting the authorized agency device 360 access and control over the equipment of the client device 340*a*, no input may be required from the client device 340*a* to control the equipment of the client device 340*a*.

The host controls granted to the authorized agency device 360 may also allow the authorized agency device 360 to join additional authorized agency devices to the incident response session. In other words, if the authorized agency device 360 is granted host controls, the authorized agency device 360 may invite and join a second authorized agency device, such as an authorized agency device from a separate authorized agency. For example, if the authorized agency device 360 is from the local first responder department, the authorized agency device 360 may join a second authorized agency device from a regional or state-level first responder department.

The host controls may also allow the authorized agency device 360 to grant another client device host controls. Following the example above, if the second authorized agency device from the state-level first responder department is joined to the incident response session, the authorized agency device 360 may grant the second authorized agency device host controls so that the state-level first responder department can receive and control audio and video streams from the client devices 340*a*-340*m* of the incident response system. This can allow multiple authorized agencies to monitor and respond to an incident simultaneously.

In some embodiments, the host controls may be automatically granted to a second authorized agency device based on predefined criteria. For example, if the first authorized agency corresponding to the first authorized agency device 360 has lower authority (e.g., jurisdictional authority) than the second authorized agency corresponding to the second authorized agency device, then the video conference provider 310 may automatically grant the second authorized agency device host controls over the first authorized agency device 360 when joined to an incident response system. Example scenarios can include a regional or state level first responder agency having higher authority than a local first responder department or the fire department having higher authority over the local first responder department if the incident relates to fire. Additional features of the host controls are discussed in greater detail below with respect to FIGS. 7 and 8.

Figure 4:
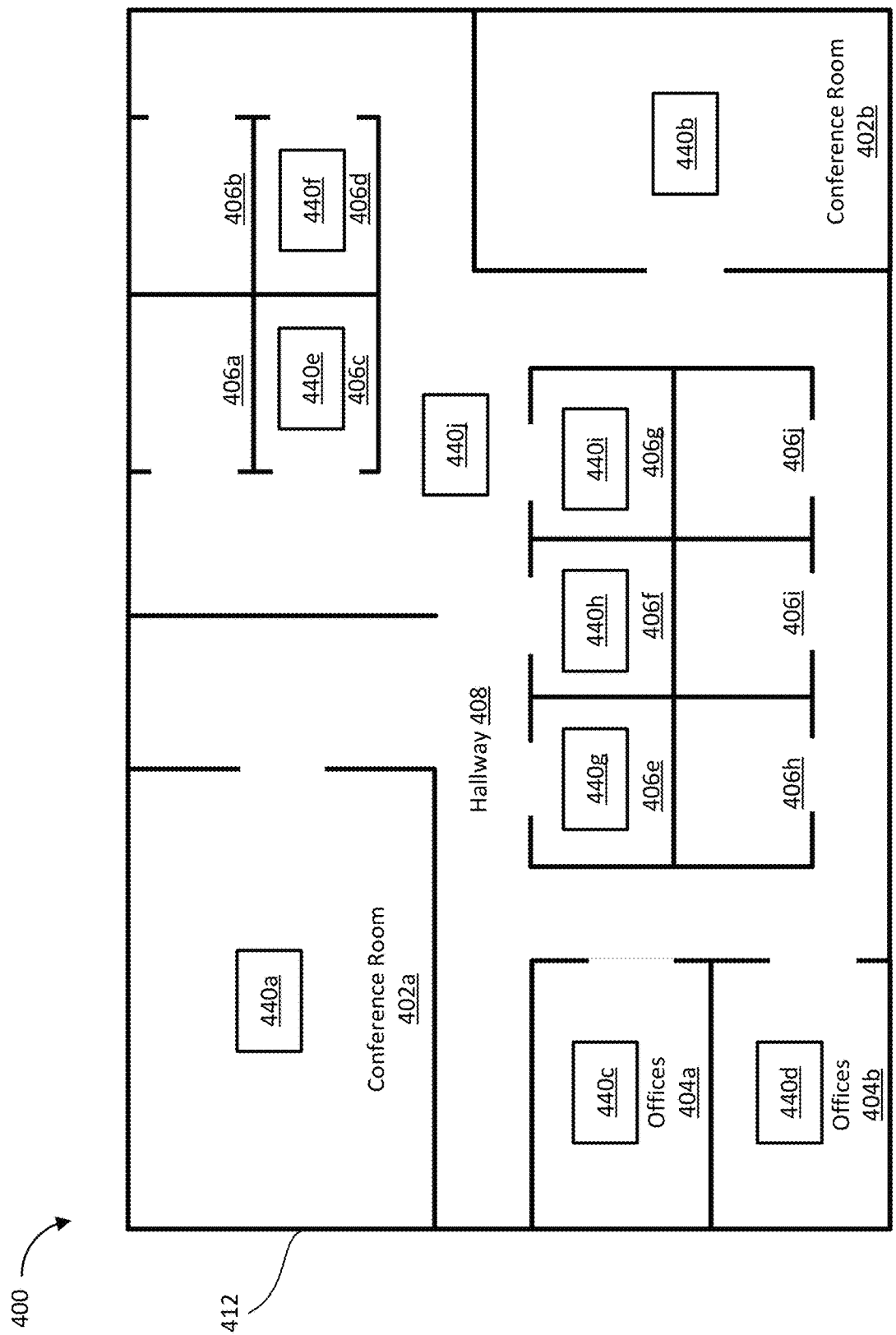
FIG. 4 illustrates an example overview of an incident response system, according to an embodiment herein.

Referring now to FIG. 4, an illustrative example of an incident response system 400 is provided, according to an embodiment herein. According to the illustrated example of FIG. 4, the incident response system 400 may be present within a facility 412. The facility 412 may be a building, such as a school, hospital, or business. As shown, the facility 412 may include numerous rooms, including conference rooms 402*a* and 402*b*, offices 404*a* and 404*b*, and cubicles 406*a*-406*j*. The facility 412 may also have other spaces, such as a hallway 408.

Within the facility 412, there may be client devices, such as computers, cell phones, or video conference systems. For example, client devices 440*a* and 440*b* may be in the conference rooms 404*a* and 404*b*, client devices 440*c* and 440*d* may be in the offices 404*a* and 404*b*, and the client devices 440*e*-440*i* may be in cubicles 406*c*-406*g*, respectively. Additionally, a client device 440*j* may be in the hallway 408. The client devices 440*a*-440*j* may be the same or similar to the client devices 340*a*-340*m*.

One or more of the client devices 440*a*-440*j* may be part of the incident response system 400. For example, one or more of the client devices 440*a*-440*j* may have accepted a request to be part of an incident response system 400 if an incident event was identified within the facility 412. As noted above, during an initial setup of a video conference application or upon joining or entering the facility 412, each of the client devices 440*a*-440*j* may have received a prompt to be part of the incident response system 400 in case of emergency. If the client devices 440*a*-440*j* accepted the request to be part of the incident response system 400, then the client devices 440*a*-440*j* may be automatically joined to an incident response session if an incident is determined. In contrast, if the client devices 440*a*-440*j* decline to be part of the incident response system 440, then the client devices 440*a*-440*j* may not be joined to an incident response session in the event that an incident is determined. In some embodiments, client devices that are not part of the incident response system 400 may receive a request to join the incident response session in the event that an incident is identified. This scenario is discussed in greater detail below with respect to FIG. 10.

Upon identification of an incident, such as a fire, unauthorized person, tornado, etc., a video conference provider, such as the video conference provider 310, may receive a request to activate or initiate the incident response system 400. Upon initiation of the incident response system 400, an incident response session may be established. As noted above, an incident response session may be similar to a virtual meeting in that the video conference provider 310 may connect to one or more of the client devices 440*a*-440*j* to transmit to and receive transmissions from each of the respective client devices within the incident response session. A key difference, however, is that each of the client devices 440*a*-440*j* that are part of the incident response system 400 may be automatically joined to the incident response session without any input on the client device side. Moreover, in some embodiments, the multimedia streams to and from the client devices 440*a*-440*j* may be controlled by the video conference provider 310 or an authorized agency device 360, such as the authorized agency device 360, which may include activating a camera or microphone or adjusting an orientation of one or both of these.

In some embodiments, the incident response session may be used to initiate an observation mode using one or more of the client devices 440a-440j. Observation mode may allow the video conference provider 310 or the authorized agency device 360 to receive multimedia streams from the client devices 440a-440j without the client devices 440a-440j receiving any transmission from the incident response session. That is, any transmission to the client devices 440a-440j may be terminated so that the authorized agency device 360 can monitor the incident. Observation mode may allow the authorized agency device 360 to observe the incident without individuals within the facility 412 being aware or requiring input from those individuals.

Once an incident response session is established, an authorized agency device, such as the authorized agency device 360 may be joined to the incident response session. As discussed above, the authorized agency device 360 may be automatically joined to the incident response session in response to its establishment. One or more of the client devices 440a-440j may be used to monitor and respond to an incident within the facility 412.

Figure 5:
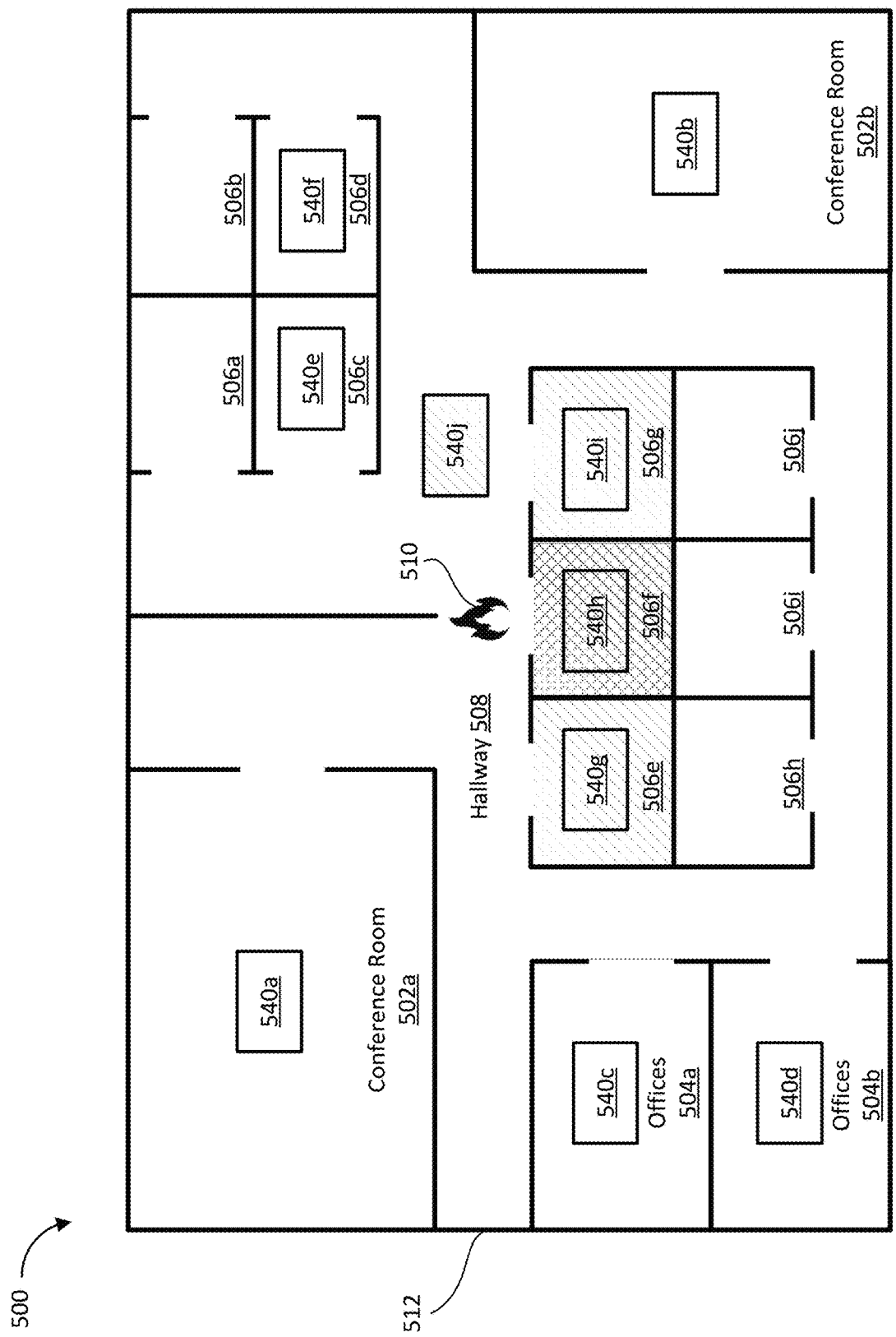
FIG. 5 illustrates an example overview of an incident response system illustrating an incident, according to an embodiment herein.

Turning now to FIG. 5, an illustrative example of an incident response system 500 illustrating an incident is provided, according to an embodiment herein. The incident response system 500 may be the same or similar to the incident response system 400, including client devices 540a-540j being the same or similar to the client devices 540a-540j. As illustrated, a facility 512 may be the same or similar to the facility 412, including conference rooms 502a and 502b, offices 504a and 504b, and cubicles 506a-506j being the same or similar to the conference rooms 402a and 402b, the offices 404a and 404b, and the cubicles 406a-406j, respectively. The facility 512 may also include a hallway 508 that is similar to the hallway 408.

At some point in time, an incident 510 may be identified within the facility 512. According to the illustrated example, the incident 510 may be a fire within the facility 512. To respond to the incident 510, including providing assistance for a safe rescue of individuals in the facility 512, the incident response system 500 may be activated. Upon activation of the incident response system 500, an incident response session may be established and an authorized agency device may be joined to the incident response session. Due to the nature of the incident 510, the video conference provider 310 may determine that the local fire department is the appropriate authorized agency to contact. As such, the video conference provider 310 may connect with an authorized agency network for the local fire department and an authorized agency device from the local fire department may be joined to the incident response session.

Based on the audio and video streams received from the client devices 540a-540j, the authorized agency device may determine that the client devices 540e-540g and 540j are within the vicinity of the incident 510. As such, the authorized agency device may control equipment on each of the respective client devices 540e-540g, and 540j to gather additional information on the incident 510. Additionally, the authorized agency device may use the client devices 540e-540g, and 540j to determine if anyone is trapped within the cubicles 506a-506g or the hallway 508.

In some embodiments, a map of the facility 512 may be generated to assist with the response efforts. A map may look similar to the illustrative example of FIG. 5 in that it may include a building layout of the facility 512. Additionally, the map may include identification of client devices that are closest to the incident 510, as well as a location of the incident 510. For example, as shown, a map may indicate that the incident 510 is located in the hallway 508. Additionally, a map may indicate which client devices are closest to the incident 510. As shown, the cubicle 506f or the client device 540h may be shaded or otherwise indicate that the cubicle 506f or the client device 540h are closest to the incident 510. A different color or shading method may be used to indicate that cubicles 506e and 506g, or the client devices 540g and 540j are also within the vicinity of the incident 510, but are slightly further away than the cubicle 506f and the client device 540h. Similarly, the client device 540j may be shaded to indicate that it too is within the vicinity of the incident 510. Any format of identification may be used to illustrate a client device's vicinity to the incident 510, including a distance from a client device to an incident.

It should be appreciated that while only one incident 510 is illustrated in FIG. 5, there may be any number of incidents 510 occurring simultaneously or sequentially within the facility 512. In some embodiments, a movement map maybe generated to show movement of the incident 510. For example, the movement map may illustrate the movement of an unauthorized person throughout the facility 512 or may illustrate the spread of a fire throughout the facility 512.

Figure 6:
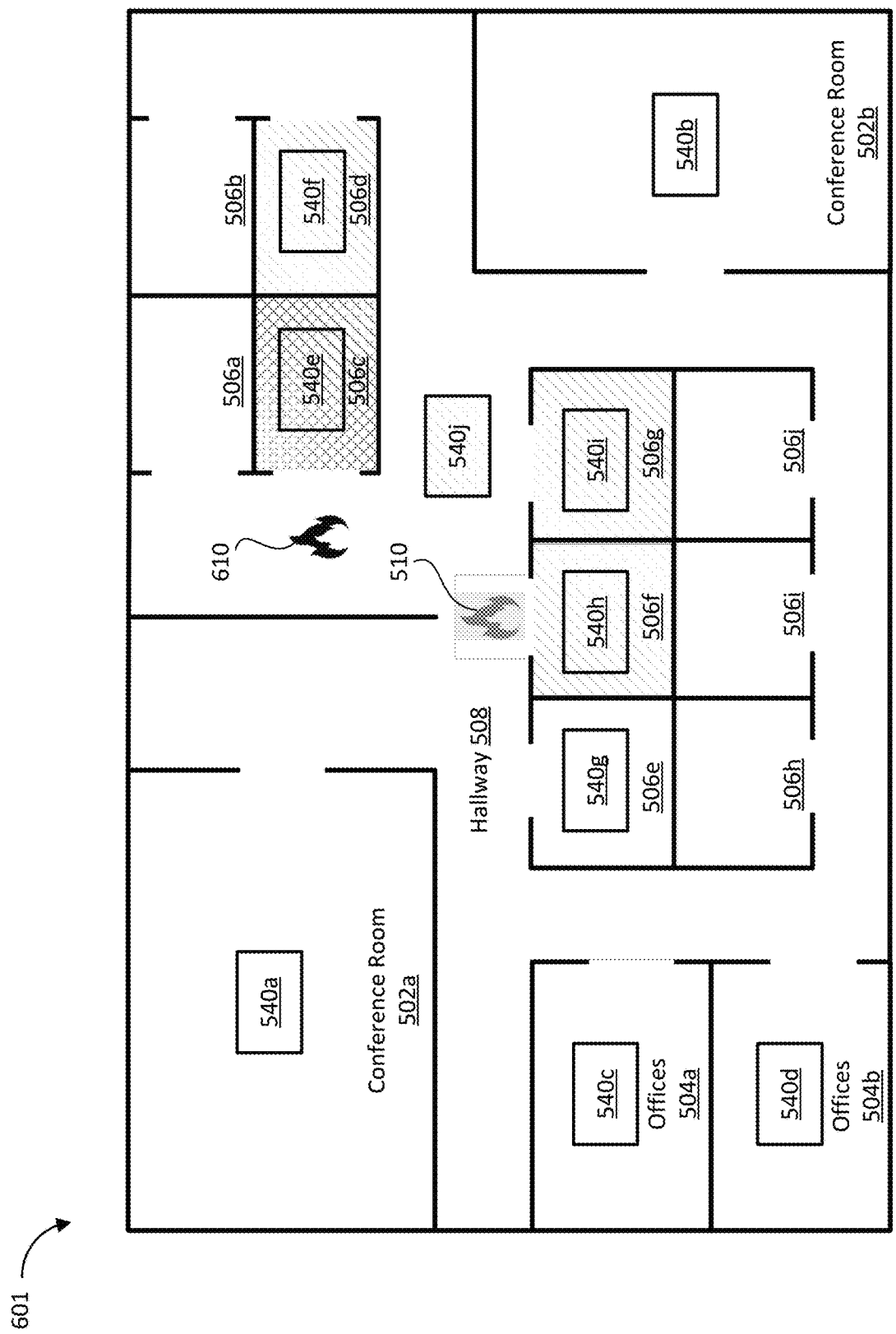
FIG. 6 illustrates an example movement map of an incident, according to an embodiment herein.

Referring now to FIG. 6, an example movement map 601 of the incident 510 is provided, according to an embodiment herein. The illustrated movement map 601 may illustrate that while response efforts extinguished the incident 510 fire, another incident 610 fire started. The movement map may also illustrate that the cubicle 506c or the client device 540e is now closest to the incident 610, thereby allowing responders to update response efforts. The movement map 601 may also indicate that the cubicles 506d, 506f, and 506g, or the client devices 540f, 540h, and 540i are now within the vicinity of the incident 610, as is the client device 540j. Again, this may allow the authorized agency device to know which client devices to engage to gather information regarding the incident 610, as well as determine if anyone is trapped within the vicinity of the client devices 540e-540f and 540h-540i.

In some embodiments, the movement map 601 may be interactive. That is, a participant viewing the movement map 601 may be able to select a client device, such as any of the client devices 540a-540j, and be provided with a corresponding audio and video stream for the selected client device. For example, if a participant selects the client device 540i from the movement map 601, the participant may be able to view a video stream and hear an audio stream from the client device 540i.

Figure 7:
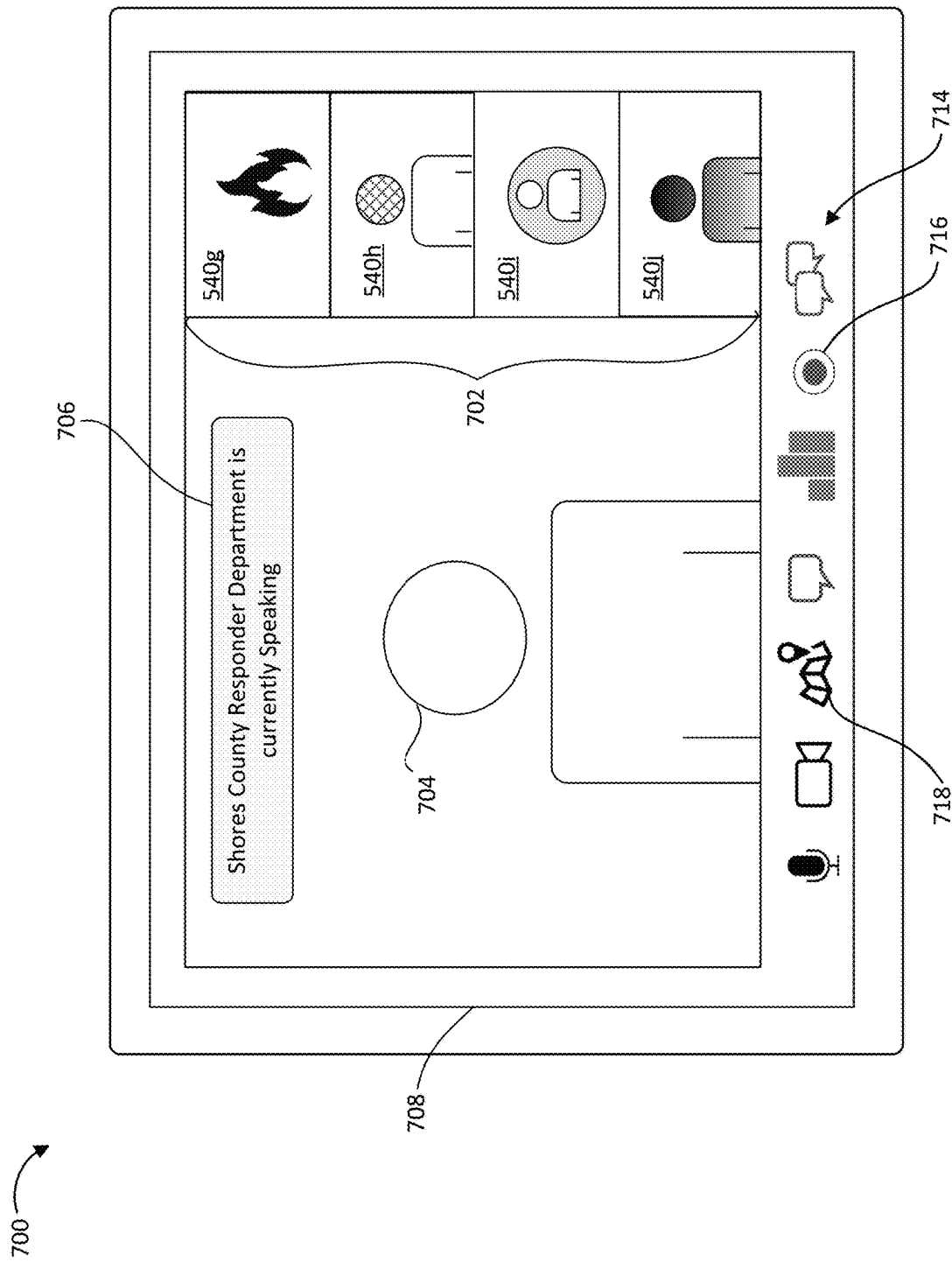
FIG. 7 illustrates a graphical user interface (GUI) for providing an incident response session using an incident response system, according to an embodiment herein.

Referring now to FIG. 7, an example graphical user interface (GUI) 700 for providing an incident response session using an incident response system is provided, according to an embodiment herein. For example, the GUI 700 may be provided to any client device that is joined to the incident response session. In some embodiments, the GUI 700 may only be provided to client devices associated with the response side of the incident response session. In an example embodiment, the GUI 700 may be provided to a second authorized agency device who has joined the incident response session as part of the response effort. The client devices, such as the client devices 540a-540j, may receive a different GUI, such as the GUI 900 described in greater detail below with respect to FIG. 9 because it may not be useful for the client devices 540a-540j to receive the multimedia streams from the other client devices 540a-540j within the incident response system 500.

As shown, the GUI 700 may include a display 708. The display 708 may include a roster 702 of video streams received from client devices within an incident response system. For example, the roster 702 may include video streams from the client devices 540g-540j from the incident response system 500. As illustrated, the video streams from the client devices 540g-540j may provide important information regarding the incident 510, including showing the incident 510 in the video stream from the client device 540g and showing individuals who are trapped in the vicinity of the incident 510 near the client devices 540h-540j.

In some embodiments, the roster may include a video stream of some or all of the participants of the incident response session, including video streams from other authorized agency devices who have joined the incident response session. In other embodiments, the roster 702 may include a picture, image, representation, avatar or a listing of some or all of the participants who have joined the incident response session. When a participant joins the incident response session, the joining participant is added to the roster 702. In some embodiments, there may be a separate roster for the client devices 540a-540j that are part of the incident response system 500 and a separate roster for client devices that are joining on the response side, such as any authorized agency devices that have joined the incident response session.

Once the incident response session is initiated, video and audio streams may be exchanged between the participants, including the client devices 540a-540j within the incident response system 500. The display 708 may display the video stream of a currently speaking participant 704, which may be an authorized agent, such as a first responder official. The audio stream from participant 704 may also be transmitted along with the video stream. In some embodiments, more than one participant may be speaking, and in such cases, display 708 may include two or more windows providing the video streams from the speaking participants.

To indicate to participants of the incident response session what responder is speaking, an indication 706 may be provided. The indication 706 may identify an authorized agency for which the participant 704 corresponds. The indication 706 can provide important context to the participant 704, such as jurisdictional information to viewing participants. In some embodiments, instead of a banner, like the indication 706, the background of the display 708 may change colors, highlight, pulse, or toggle in size to indicate the context associated with the participant 704.

The display 708 may include a dashboard 714 containing one or more action selections. For example, the dashboard 714 may include a recording selection 716 that allows a participant to record the streams of audio and video during the incident response session. This may be important for record keeping purposes or trainings subsequent to this incident. In some embodiments, the dashboard 714 may include other selections such as a chat selection, a polling selection, and the like.

In some embodiments, the dashboard 714 may include a map selection 718. The map selection may allow a participant to view a movement map of an incident event. For example, upon selection of the map selection 718, a display of the movement map 601 may be provided on the GUI 700. As noted above, the movement map 601 may be interactive in that a participant can select client devices or regions on the movement map 601 and be provided with a corresponding multimedia stream.

As noted above, the authorized agency device may be granted host controls over the incident response session. The host controls may allow the authorized agency device the ability to join one or more authorized agency devices to the incident response session. Additionally, the host controls may allow the authorized agency device the ability to create breakout rooms. Breakout rooms may allow different responders to address and correspond as needed to aid in various response efforts.

Figure 8:
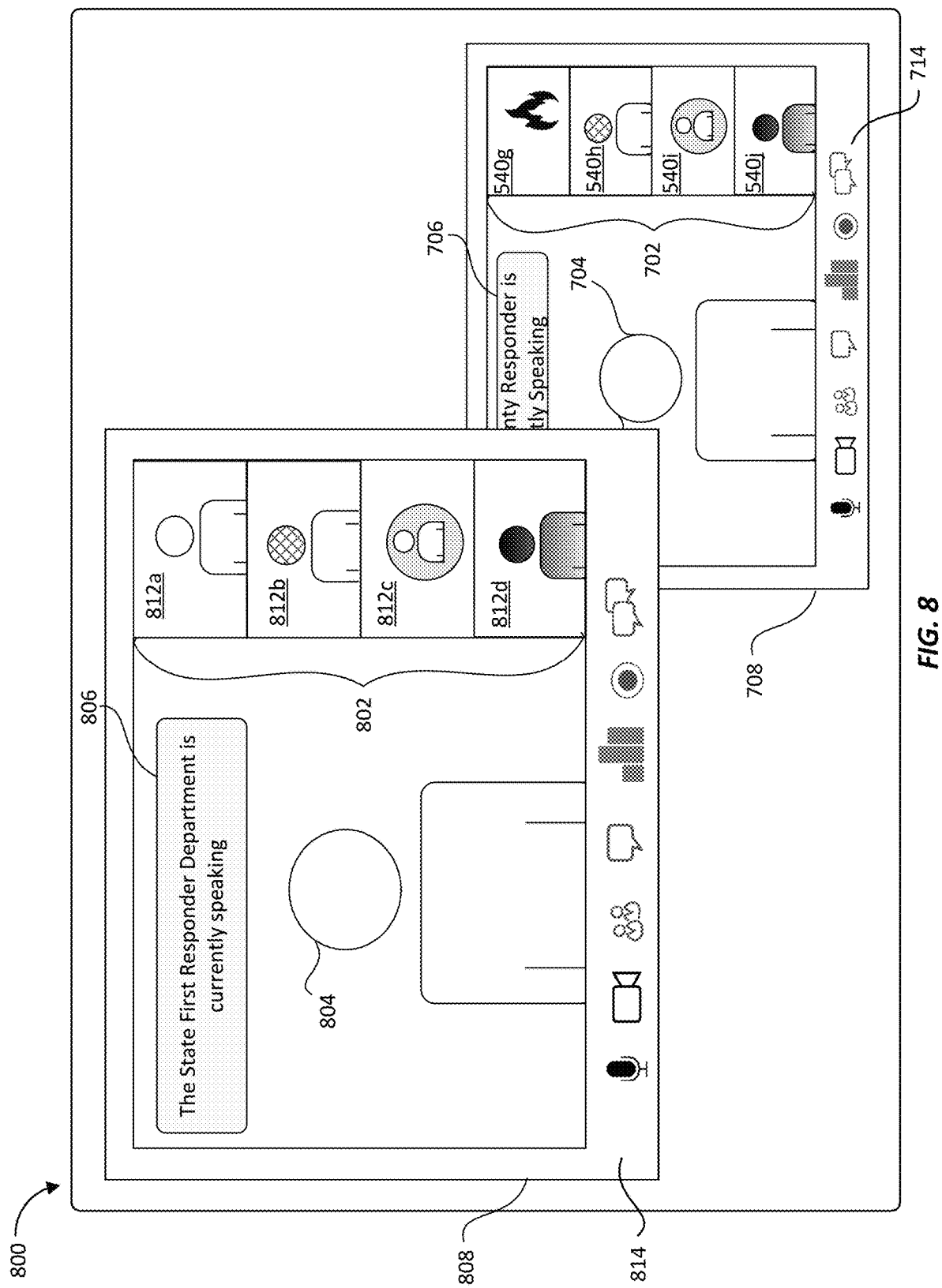
FIG. 8 illustrates another GUI for providing an incident response session using an incident response system, according to an embodiment herein.

Referring now to FIG. 8, an example GUI 800 for providing an incident response session using an incident response system is provided, according to an embodiment herein. Specifically, the GUI 800 illustrates an incident response session having multiple breakout rooms. The GUI 800 may illustrate an embodiment in which a second authorized agency device has joined the incident response session and a breakout room has been created to allow the second authorized agency device to correspond with desired client devices per its response effort. For example, the authorized agency device from the GUI 700 may be from the local first responder's department. To aid in the response effort, the local first responder's department may have joined the state-level first responder department to the incident response session. As part of joining the state-level first responder department to the incident response session, the local first responder's department may have created a separate breakout room so that the state-level first responder department can coordinate its response efforts while the local first responder's department continues its own response efforts in parallel.

Upon creating a breakout room, the authorized agency device may indicate and grant the second authorized agency device host controls over the breakout room. For example, the local first responder's department may grant the second authorized agency device associated with the state-level first responder department host controls over the breakout room. Pursuant to the creation of the breakout room, the second authorized agency device may join authorized agency devices 818a-818d. For example, the authorized agency devices 818a-818d may correspond to other state-level first responder department agents who are needed for the response effort.

As shown, the GUI 800 may include a second display 808 in which a participant 804 from the state-level first responder department is speaking. The second display 808 may also include a roster 802 that provides a listing of participants present in the breakout room. The roster 802 may be the same or similar to the roster 702 in that a video stream or a representation of the client devices 818a-818d may be provided.

When a breakout room is created, a viewing participant may still be able to view both the breakout room and the initial incident response session. To do so, a viewing participant may be provided with the GUI 800 having both the display 708 and the display 808. A viewing participant may be able to toggle between the displays 708 and 808, while in other embodiments, one of the displays may be selected as the primary focus for the viewing participant. For example, as illustrated, because the state-level first responder department has jurisdictional priority over the local first responders department, the display 808 may be enlarged and overlay the display 708 such to be the primary focus of the GUI 800. The display 808 may be modified in other manners to become the primary focus of the GUI 800, such as centering in the GUI 800 or pulsing when the participant 804 is speaking.

The display 808 may also provide an indication 806 of the authorized agency device hosting the breakout room. Similar to the indication 706, the indication 806 may provide context to the breakout room or the participant 804. For example, the indication 806 may indicate the jurisdiction or status of the participant 804, such as modifying a background of the breakout room or providing an overlay indicating the context of the breakout room. Additionally, the display 808 may also include a dashboard 814 which may include selections similar to those from the dashboard 714.

When viewing the breakout room and the initial incident response session, a viewing participant may receive two audio streams: one from the breakout room and one from the initial incident response session. For the illustrated example, a viewing participant may receive an audio stream from the participant 804 speaking and an audio stream from the participant 704 speaking. Upon entry or initiation of the breakout room, the client device of the viewing participant may be configured to target and provide audio from the breakout room over the audio from the initial incident response session, since the sounds from the two virtual meetings would likely overlap, be difficult to understand, and may lack saliency if they were output to the client device at the same time.

To prevent the viewing participant from receiving the two audio streams at full volume at the same time, the viewing participant can adjust the volume of audio streams from the initial incident response session to a background level while the audio streams from the breakout room remains at a normal audio level. In some cases, the audio level of each respective audio stream may be automatically adjusted upon selection of the primary meeting (e.g., the display in primary focus of the GUI 800). For example, upon selection of the breakout room as the primary meeting, the audio from the initial incident response session may be muted and the audio from the breakout room may be provided at a normal level. The viewing participant may have the option to receive audio streams from both the initial incident response session and the breakout room, such as by reducing the volume of one of the two audio streams, or by playing each audio stream from a different audio output device, e.g., the initial incident response session audio is played from the left speaker and the breakout room audio is played from the right speaker.

As noted above, the client devices 540a-540j that are part of the incident response system 500 may receive a different GUI, according to some embodiments. That is, the GUIs 700 and 800 may not be provided to the client devices 540a-540j. It could be appreciated that it may be useful to only provide the client devices 540a-540j within the facility 512 with filtered and specific information. Instead of being provided with the GUIs 700 and 800, the client devices 540a-540j may be provided with an incident specific GUI.

Figure 9:
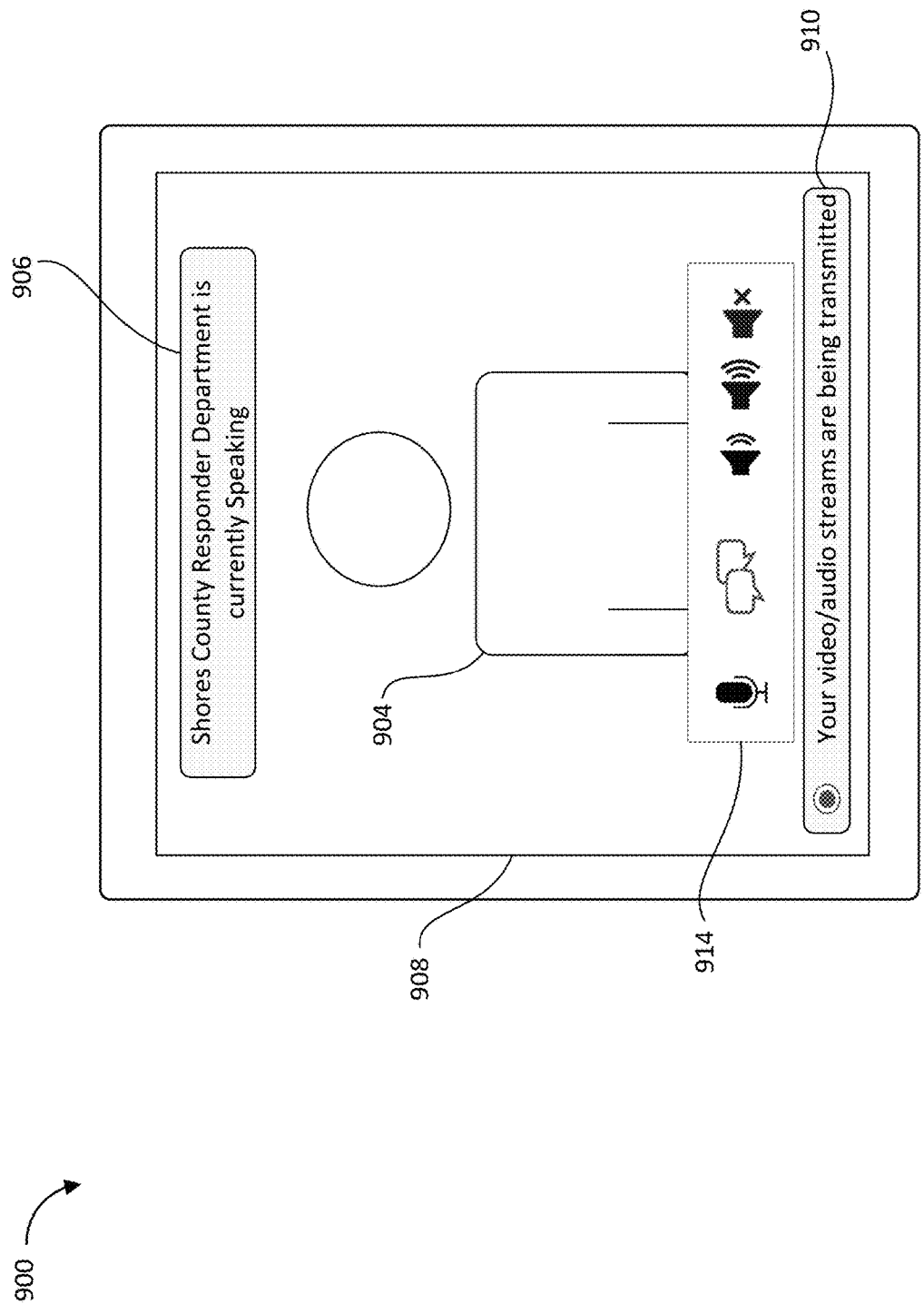
FIG. 9 illustrates a GUI provided to a client device that is part of an incident response system, according to an embodiment herein.

Referring now to FIG. 9, a GUI 900 provided to a client device that is part of an incident response system is provided, according to an embodiment herein. For example, the GUI 900 may be provided to the client device 540h. In some embodiments, all of the client devices 540a-540j may receive the GUI 900 because they are part of the incident response system 500, while in other embodiments, the GUI 900 may only be provided to specific client devices that are near the incident 510, such as the client device 540h.

As shown, the GUI 900 may include a display 908. The display 908 may be similar to the displays 708 or 808 in that it may provide a video stream of a speaking participant 904. As illustrated, the participant 904 may be a first responder official from the authorized agency device. Along with a video stream from the authorized agency device, an audio stream may also be provided. In some embodiments, instead of an audio stream, a transcription of the speaking participant 904's audio stream may be provided. It can be appreciated that there may be scenarios in which playing audio from the client device 540h during an incident may be undesirable as it could pose a danger to individuals near the client device 540h. In still other embodiments, a map, drawing, or digital signage may be transmitted to the client device 540h to assist in the response to the incident. For example, the a map of the nearest exits or a rescue route may be transmitted to the client device 540h.

The display 908 may also provide an indication 906. The indication 906 may be the same or similar to the indication 706 in that it may provide context to the viewing participant as to a jurisdiction or status of the speaking participant 904. For example, as shown, the indication 906 may indicate that the speaking participant 904 is from the Shores County First Responder department.

The display 908 may also include a dashboard 914. The dashboard 914 may be different from the dashboards 714 and 914 in that only limited selections are provided. For example, the dashboard 914 may only include selections to allow the client device 540h to speak to the speaking participant 904 (e.g., the microphone icon), message the speaking participant 904 (e.g., the chat message icon), or volume controls.

In some embodiments, the display 908 may also include a notification 910. The notification 910 may indicate that the audio or videos streams from the client device 540h are being transmitted to the authorized agency device. For example, the authorized agency device may, upon determining that the client device 540h is near the incident 510, activate the equipment of the client device 540 such to receive a video and audio stream from the client device 540h. Upon receiving the video and audio stream from the client device 540h, the display 908 may provide the notification 910 to indicate the transmission of the audio and video streams. This may provide important information to individuals within the vicinity of the client device 540h, such as letting them know that officials can see and hear them.

Figure 10:
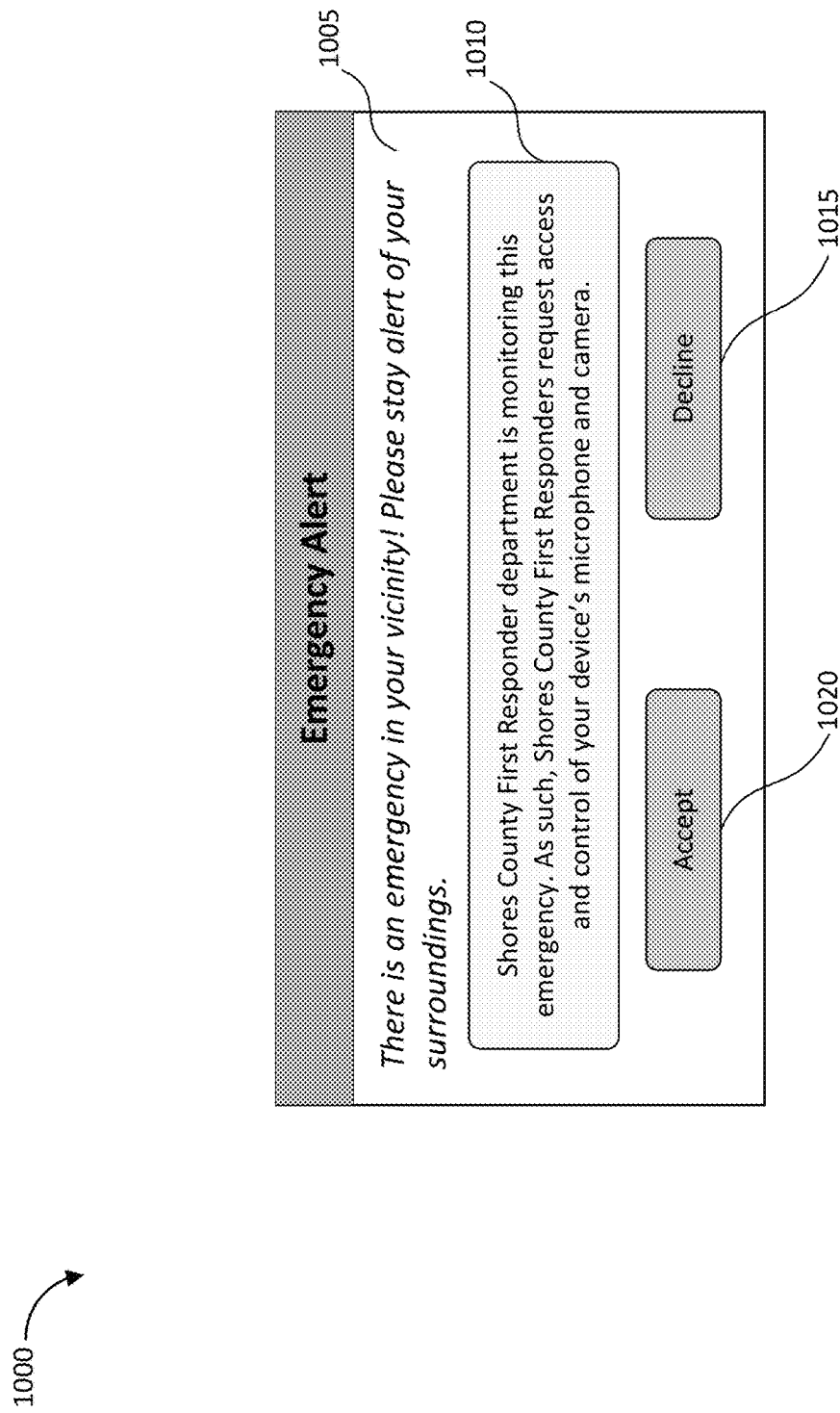
FIG. 10 illustrates an emergency alert received by a client device within the vicinity to an incident response system, according to an embodiment herein.

As noted above, in some embodiments, client devices that are not part of the incident response system may be notified of the incident response session and can be requested to join the incident response session. Referring now to FIG. 10, an emergency alert 1000 received by a client device within the vicinity to an incident response system is provided, according to an embodiment herein. With reference to FIG. 5, if an individual associated with the client device 540j is a visitor to the facility, the client device 540j may not be part of the incident response system. However, since the client device 540j is within the vicinity of the incident 510, the client device 540j may receive an emergency alert, such as the emergency alert 1000.

Prior to the client device 540j receiving the emergency alert 1000, a determination may first be made that the client device 540j is within the vicinity of the incident 510. For example, if the client device 540j joined the facilities network, then an IP address of the client device 540j may be used to determine its location. In other embodiments, global positioning system (GPS) data or cellular network data from the client device 540j may be used to determine its location. Based on this information, it may be determined that the client device 540j is within a predetermined vicinity of the incident 510 and therefore may be useful to response efforts. In some embodiments, the client device 540j's nomadic e911 may be used by the authorized agency, such as the authorized agency network 350, to determine the location of the client device 540j. In some embodiments, the strength of a Wi-Fi signal for the client device 540*j* may be used to determine the proximity of the client device 540*j* to the incident 510.

Once the client device 540*j* is identified as being within the vicinity of the incident 510, the video conference provider 310 may transmit the emergency alert 1000 to the client device 540*j*. As shown, the emergency alert 1000 may include a notice 1005 that there is an emergency within the vicinity. Additionally, the emergency alert 1000 may include a request 1010 for the client device 540*j* to join the incident response session. In some embodiments, instead of the emergency alert 1000, the video conference provider 310 may simply transmit a request or invite for the client device 540*j* to join the incident response session. In an example scenario, the client device 540*j* may receive a URL, QR code, or other mechanism to join the incident response session upon selection.

In some embodiments the request 1010 may include a description of the incident response session, specifically indicating that an authorized agency device is monitoring the incident. The request 1010 may also include a notification that by joining the incident response session the client device 540*j* grants control of equipment configured to generate one or more multimedia streams from the client device 540*j* to the video conference provider 310 or the authorized agency device 360. For example, as illustrated, the request 1010 may include language indicating that an official or first responder agency request access and control of the client device 540*j*'s microphone and camera.

If the individual associated with the client device 540*j* does not want to join the incident response session, a button 1015 may be selected. Upon selection of the button 1015, the video conference provider 310 or the authorized agency device 360 may receive an indication that the client device 540*j* has declined to join the incident response session. In contrast, if the individual associated with the client device 540*j* would like to join the incident response session, a button 1020 may be selected. Upon selection of the button 1020, the client device 540*j* may be joined to the incident response session and the authorized agency device 360 may gain access and control of the client device 540*j*'s equipment used to generate audio and video streams (e.g., microphone and camera).

In some embodiments, the audio streams from the client devices that are part of an incident response session, such as the client devices 540*a*-540*j*, may be monitored for content (e.g., keywords) indicating an incident. For example, the audio streams from the client devices 540*a*-540*j* may be monitored for the keyword "fire" or "help." This may assist the authorized agency devices in identifying an incident, identifying client devices that are near an incident, or individuals in need of assistance due to the incident. Additionally, in some embodiments, instead of transmitting an audio stream of a speaking participant, such as the speaking participant 904, to the client devices 540*a*-540*j*, a transcription of the audio stream from the speaking participant 904 may be provided. In still further embodiments, a transcription from audio streams transmitted during an incident response session, and any related breakout rooms, may be generated for record or training purposes.

Figure 11:
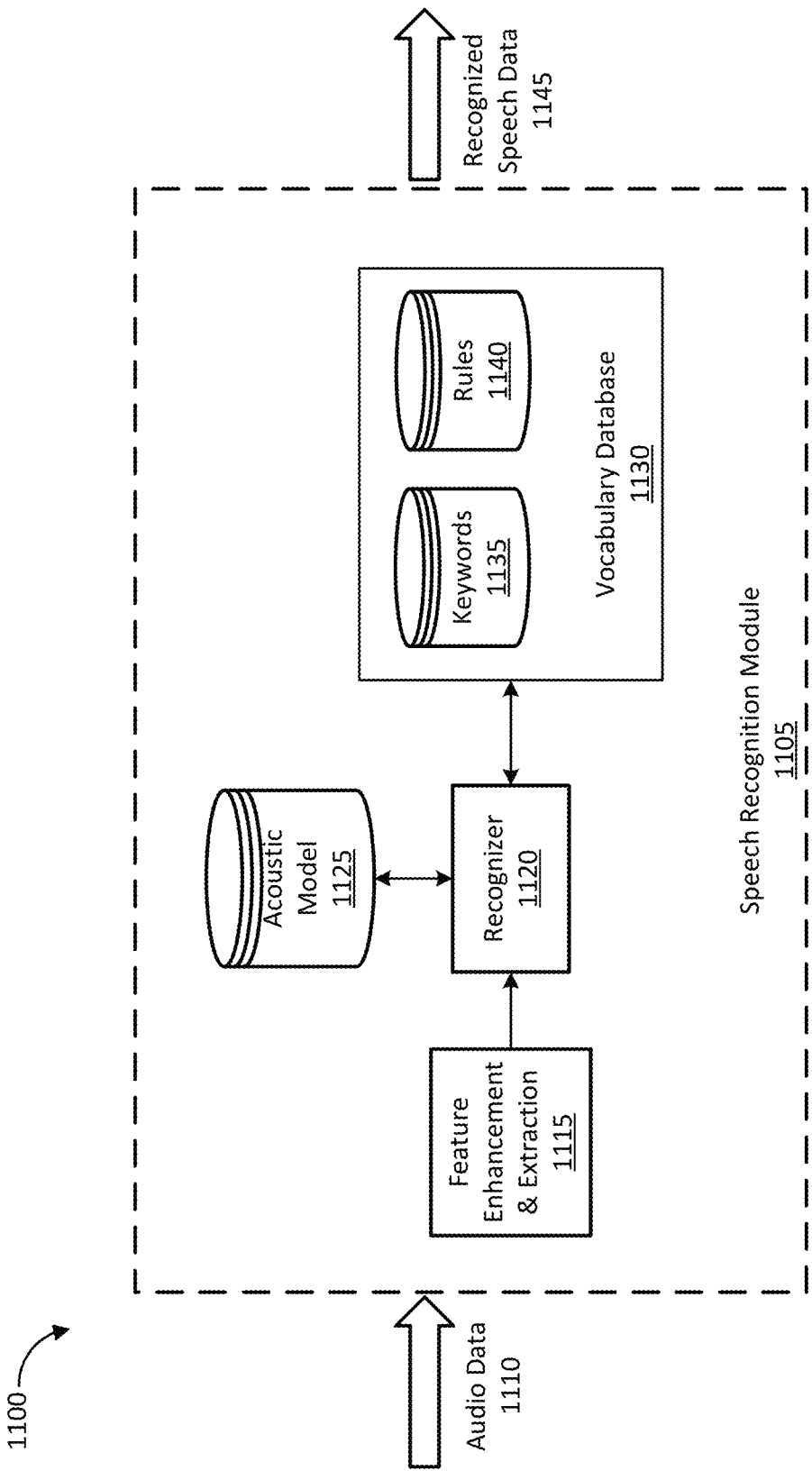
FIG. 11 illustrates an example speech recognition system that may be locally or remotely executed, according to an embodiment herein.

Turning now to FIG. 11, an example speech recognition system 1100 that may be used for incident response functionality is provided. The speech recognition system 1100 may be executed locally or remotely. For example, the speech recognition system 1100 may be locally executed on a client device, however, in other embodiments, the speech recognition system 1100 may be cloud-based and/or remotely executed by a video conference provider, such as the video conference provider 310, or a third-party system.

Figure 12:
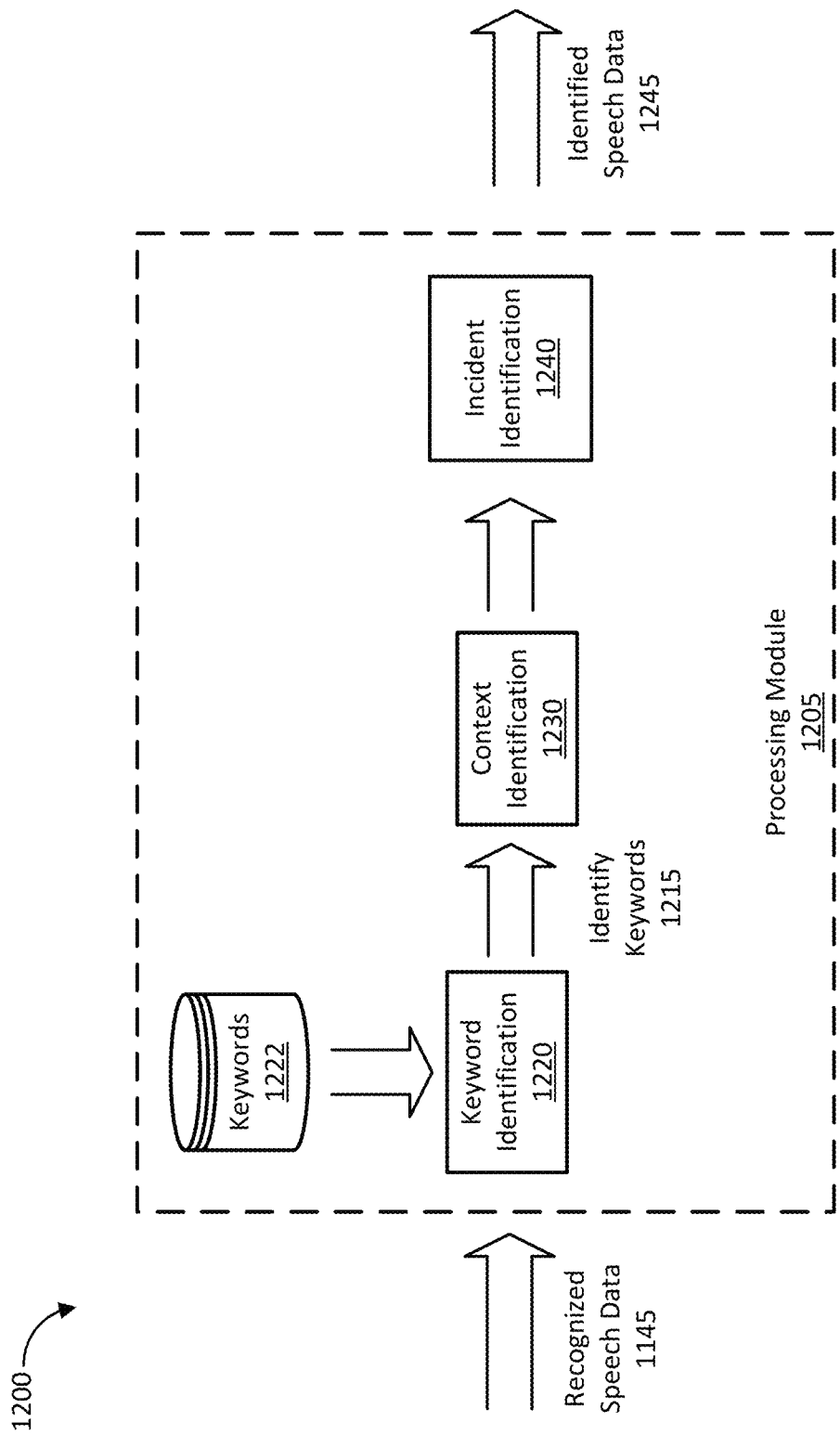
FIG. 12 illustrates an example incident response identification system that may be locally or remotely executed, according to an embodiment herein.

The speech recognition system 1100, along with the incident identification system 1200 described in greater detail with respect to FIG. 12, may be used to perform one or more of the incident response functions described herein. For example, in some embodiments, the speech recognition system 1100 may be used to identify keywords or audio patterns indicating an incident event. For example, the speech recognition system 1100 may identify keywords in an audio stream from the client device 540*h* indicating that a person is trapped in the cubicle 506*f*. In other embodiments, the speech recognition system 1100 may be used to provide a live transcription of a speaking participant's audio stream or a transcription of audio streams exchanged during the incident response session.

To perform speech recognition, the speech recognition system 1100 may include a speech recognition module 1105. The speech recognition module 1105 may receive audio data 1110. The audio data 1110 may correspond to audio captured by the client device 340*a*, for example by a microphone. In other embodiments, the audio data 1110 may be received from the video conference provider 310. The audio data 1110 may be a recording of an audio track or may be a transcript of the audio track. The speech recognition module 1105 may be or include a speech recognition system or model as known in the art. The following is an example speech recognition module following an example speech recognition process; however, it should be understood that other speech recognition modules or processes may be used.

Once the audio data 1110 is received by the speech recognition module 1105, the audio data 1110 may be processed by a feature enhancement and extraction module 1115. The feature enhancement and extraction module 1115 may analyze the audio data for features corresponding to words and then enhance and extract any identified features. The identified features may correspond to audio waveforms present in human speech.

The speech recognition module 1105 may also include a recognizer 1120. The recognizer 1120 may receive the identified features from the audio data 1110. The recognizer 1120 may employ an acoustic model 1125 and a vocabulary database 1130 to determine or associate the identified features in the audio data 1110 to one or more words.

In an example embodiment, the acoustic model 1125 may analyze the raw audio waveforms in the identified features and determine a corresponding phoneme for each waveform. In some embodiments, this is performed at the character or subword level. The vocabulary database 1130 may be a language model. The vocabulary database 1130 may include a rules database 1140 and a word database 1135. The rules database 1140 may provide various rules for speech, allowing the recognizer to discard any association of identified features (e.g., audio waveforms) to phonemes that are improbable given the constraints of proper grammar and the topic of discussion. Once an appropriate mapping of the identified features to phonemes is generated, the recognizer 1120 may determine words associated with the phonemes. The words may be based on the words database 1135.

Once the phonemes are associated with respective words, recognized speech data 1145 is generated. It should be understood that this process may be performed nearly instantaneously. For example, the speech recognition module 1105 may generate the recognized speech data 1145 during the meeting as the audio streams are being received by the video conference provider 310 or another system that is hosting the speech recognition system 1100. The recognized speech 1145 may be then used to perform one or more incident response functions, such identifying an incident.

Turning now to FIG. 12, an example incident identification system 1200 is provided. The incident identification system 1200 may include processing module 1205 that is used to perform one or more of the privatization functions described herein. For example, in one case, the recognized speech 1145 may be received from the speech recognition system 1100 to identify an incident from an audio stream received from the client device 540*h*.

The recognized speech 1145 may be received by the keyword identification system 1220. The keyword identification system 1220 may identify one or more keywords in the recognized speech data 1245. The database of known keywords 1222 may be queried to identify any keywords in the track of recognized speech data 1145. Keywords in the keyword database 1222 may be based on keywords associated with common incident events. For example, keywords may include words like "fire," "help, "stop," and the like. In some embodiments, keywords may include one or more emotion expressions, such as screaming or crying.

It should be understood that a keyword may include more than one word. For example, "get out of here" may be a keyword indicating that an individual is seeking a means of escape. Depending on various implementations, multi-word keywords may be treated as a single keyword or as multiple associated keywords. Further, a keyword may have multiple different forms. For example, a keyword may be a verb, which may be spelled different depending on context, e.g., it is conjugated differently depending on tense, subject, etc. Thus, a keyword may include variants of a base word, e.g., "shoot," "shot," and "shooting." In some examples each of these may be a distinct keyword, while in other examples, the variants may be associated with a base term, e.g., "shoot," that is used as the keyword. However, any suitable approach to recognizing keywords may be used.

If one or more keywords 1215 is recognized, the processing module 1205 then may identify a context 1230 associated with the keyword 1215. In this example, to identify a context, the processing module 1205 may employ a trained machine learning ("ML") technique to semantically analyze the speech or transcript associated with the identified keyword 1215 to determine additional related keywords and/or descriptors. To perform the analysis, the trained ML technique may be provided the keyword(s) and a predetermined number of words near the keyword, e.g., preceding and following the keyword(s), such as five to ten words preceding and following the keyword(s). Words such as articles (e.g., "a", "the") or prepositions such as "of" or "for" may be omitted from the word count in some examples.

Since people may use jargon or colloquial terms to refer to particular actions, the context identification 1230 functionality may normalize recognized words to specific meanings. For example, the terms "kids," "offspring," "kiddos," "little ones," etc. all refer to children. Thus, the context identification 1230 functionality may map such terms to have a single meaning (e.g., children). Such mappings may be provided for multiple different phrases and corresponding terms. Similarly, synonyms or words related to keywords may also be identified.

Once the context identification 1230 has identified the one or more keywords 1215 and identified the context of the identified keywords 1215, the processing module 1205 may perform an incident identification 1240. The processing module 1205 may determine, based on the identification of the keywords 1215, and the context of the keywords, that the keywords 1215 correspond to an incident response. Based on predetermined keywords and context, the incident identification 1240 may determine an incident event corresponding to identified keywords 1215. For example, the incident identification 1240 may determine that the incident 510 is a fire based on the identified keywords "fire" or "burning" in an audio stream received from the client device 540*h*. In another example, the incident identification 1240 may identify client devices in which individuals are in need of aid. For example, the incident identification 1240 may be able to flag the client device 540*h* for the authorized agency device as potentially needing rescue assistance based on the identified keywords "help" or "save me."

The incident identification 1240 may process the keywords 1215 in the audio data to generate identified speech data 1245. The identified speech data 1245 may include speech data that has been identified as being relevant to an incident event, as described above. In some embodiments, the identified speech data 1245 may be used to generate an alert for the authorized agency device to flag a client device corresponding to the audio stream containing the identified speech data 1245.

Figure 13:
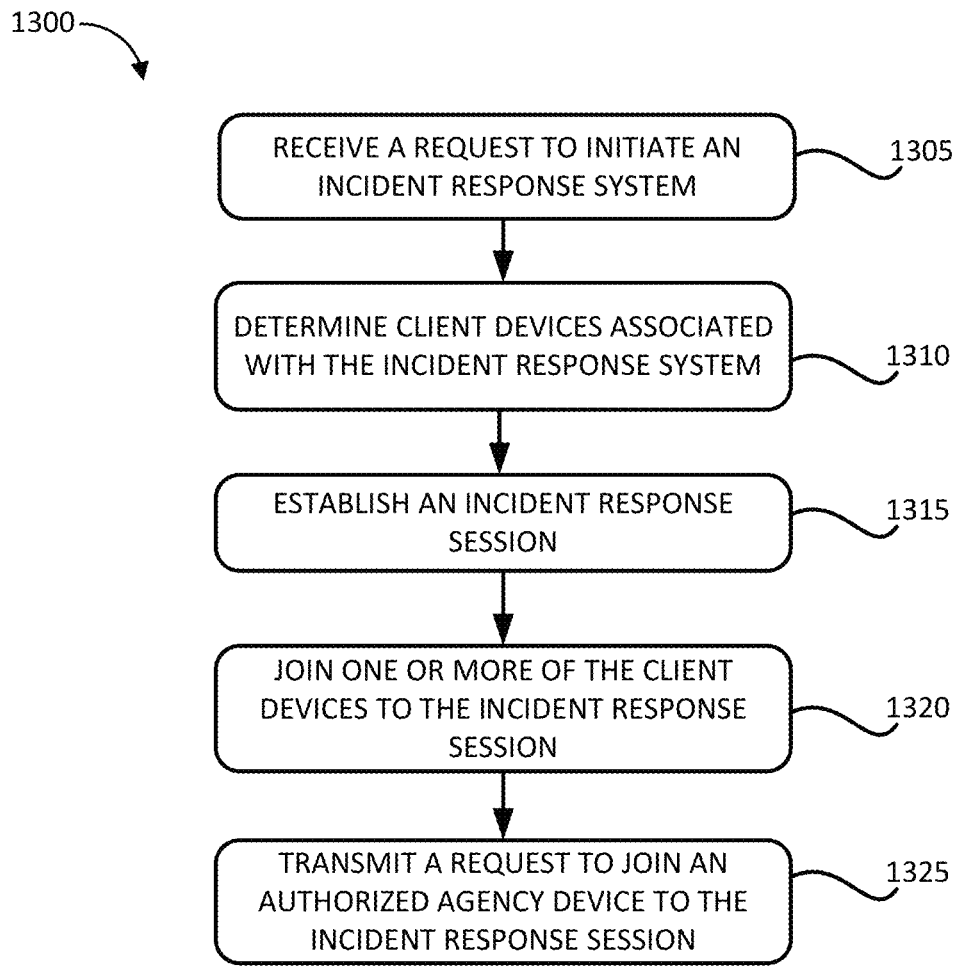
FIG. 13 illustrates an exemplary method for providing an incident response system, according to an embodiment herein.

Referring now to FIG. 13, a flowchart of an example method 1300 for providing an incident response system is provided, according to an embodiment herein. The description of the method 1300 in FIG. 13 will be made with reference to FIGS. 3-12, however any suitable system according to this disclosure may be used, such as the example systems 100 and 200, shown in FIGS. 1 and 2.

The method 1300 may include step 1305. At step 1305, a request to initiate an incident response system, such as the incident response system 400 or 500, may be received. The request may be received by a video conference provider, such as the video conference provider 310.

The method 1300 may also include steps 1310 and 1315. At step 1310, a plurality of client devices associated with the incident response system may be determined. For example, the video conference provider 310 may determine that client devices 440*a*-440*j* are associated with the incident response system 400. At step 1315, an incident response session may be established with the incident response system. For example, the video conference provider 310 may establish an incident response session using the incident response system 400.

The method 1300 may also include steps 1320 and 1325. At step 1320, of client devices may be joined to the incident response session. For example, the video conference provider 310 may join one or more of the client devices 440*a*-440*j* to the incident response session. At step 1325, a request to join an authorized agency device to the incident response session may be transmitted. For example, the video conference provider 310 may transmit a request to the authorized agency network 350 to join the authorized agency device 360 to the incident response session.

In some embodiments, the method 1300 may also include joining, by the video conference provider 310, the authorized agency device 360 to the incident response session and generating, by the video conference provider 310, a notification, such as the notification 706, of the presence of the authorized agency device 360 in the incident response session. The method 1300 may also include receiving, by the video conference provider 310, one or more multimedia streams from each of the client devices 440*a*-440*j* joined to the incident response session and transmitting, to the authorized agency device 360, the one or more multimedia streams from each of the client devices 440*a*-440*j* joined to the incident response session. Optionally, the method 1300 may include transmitting a multimedia stream from the authorized agency device 360 to each of the client devices 440a-440j.

In some embodiments, the video conference provider 310 may receive a request for host controls over equipment of the client devices 440a-440j generating the one or more multimedia streams. The video conference provider 310 may grant the host controls over the equipment of the client devices 440a-440j for the authorized agency device 360. As discussed above, the host controls may allow the authorized agency device 360 to control the equipment of the one or more plurality of client devices 440a-440j generating the one or more multimedia streams.

In some embodiments, the authorized agency device 360 may transmit a request to join a second authorized agency device to the incident response session. In such cases, the video conference provider 310 may join the second authorized agency device to the incident response session. In cases where a second authorized agency device has joined an incident response session, the method 1300 may include receiving, from the authorized agency device 360, a request to grant secondary host controls to the second authorized agency device and granting, by the video conference provider 310, secondary host controls to the second authorized agency device.

In some embodiments, the method 1300 may also include receiving, from the authorized agency device 360, a request to modify a first multimedia stream from a first client device of the client devices 440a-440j, transmitting, by the video conference provider 310, a signal to the first client device to modify the first multimedia stream, receiving, by the video conference provider 310, a modified first multimedia stream from the first client device based on the signal to modify the first multimedia stream, and transmitting, to the authorized agency device 360, the modified first multimedia stream from the first client device. The signal to modify the first multimedia stream may include one or more of a request to activate a camera associated with the first client device, a request to activate a microphone associated with the first client device, a request to activate a speaker associated with the first client device, a request to increase a volume of an audio stream transmitted by the first client device, or a request to modify a video stream transmitted by the first client device.

Optionally, the method 1300 may include receiving, from the authorized agency device 360, a request for an observation mode for the incident response session and terminating, by the video conference provider 310, transmission of one or more multimedia streams from the authorized agency device 360 to the client devices. In another embodiment, the method 1300 may include receiving, from the authorized agency device 360, a request to create one or more breakout rooms for the incident response session, receiving, from the authorized agency device 360, an assignment of participants for each of the one or more breakout rooms, generating, by the video conference provider 310, the one or more breakout rooms, and joining, by the video conference provider 310, client devices based on the assignment of participants to a respective breakout room of the one or more breakout rooms as indicated by the authorized agency device 360.

In some embodiments, the method 1300 may include identifying, by the video conference provider 310, a first client device of the client devices 440a-440j based on a first multimedia stream received from the first client device, wherein the first multimedia stream indicates an incident event within a vicinity of the first client device, and transmitting, to the authorized agency device 360, a notification of the incident event within the vicinity of the first client device.

Figure 14:
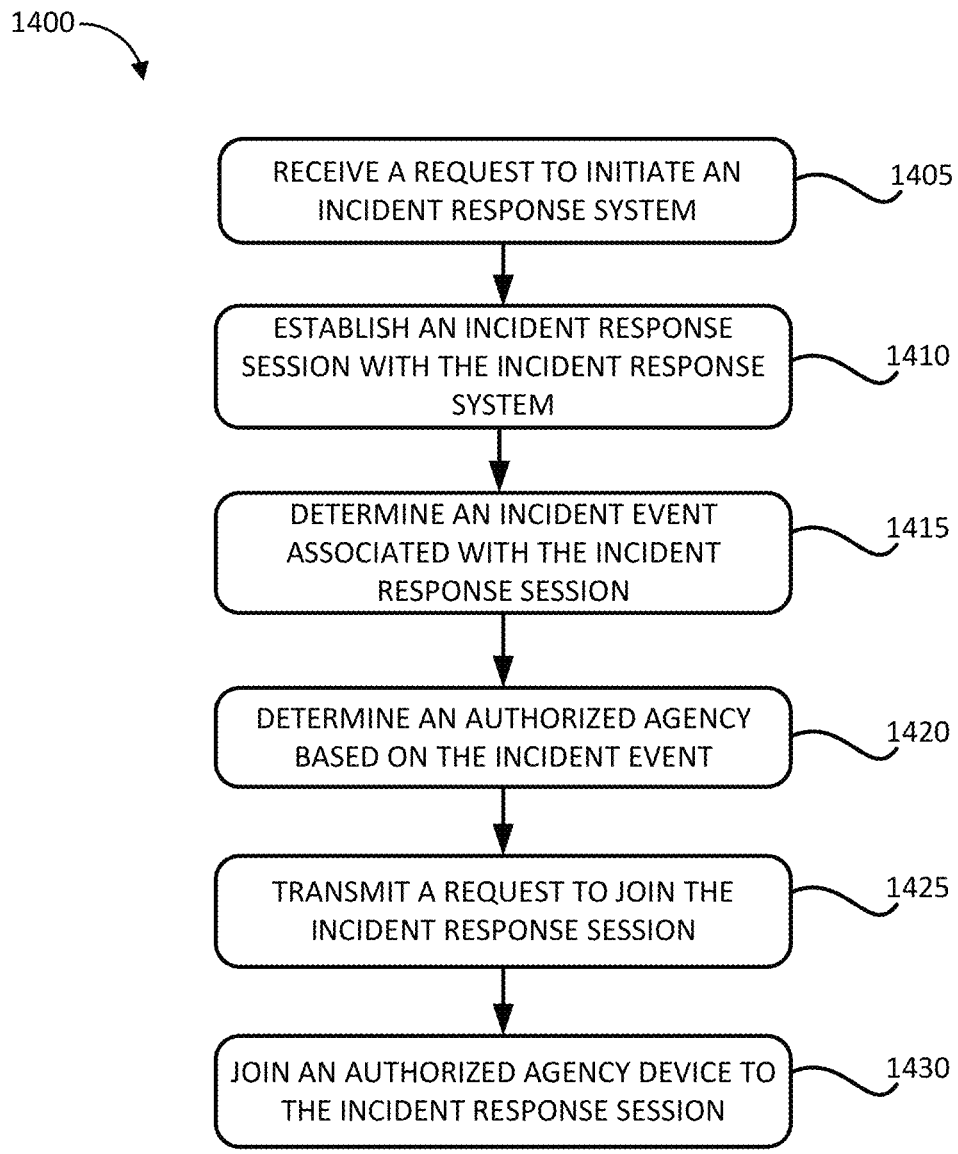
FIG. 14 illustrates an exemplary method for providing authorized agency system access, according to an embodiment herein.

Referring now to FIG. 14, a flowchart of an example method 1400 for providing authorized agency system access is provided, according to an embodiment herein. The description of the method 1400 in FIG. 14 will be made with reference to FIGS. 3-12, however any suitable system according to this disclosure may be used, such as the example systems 100 and 200, shown in FIGS. 1 and 2.

The method 1400 may include step 1405. At step 1405, a request to initiate an incident response system, such as the incident response system 400 or 500, may be received. The request may be received by a video conference provider, such as the video conference provider 310.

The method 1400 may also include steps 1410 and 1415. At step 1410, an incident response session may be established with the incident response system. For example, the video conference provider 310 may establish an incident response session with the incident response system 400. At step 1415, an incident event associated with the incident response session may be determined. For example, the video conference provider 310 may determine the incident event 510 associated with the incident response session.

The method 1400 may also include steps 1420 and 1425. At step 1420, an authorized agency may be determined based on the incident event. For example, the authorized agency device may be determined by the video conference provider 310 based on a location of the incident response system 400.

The method may also include steps 1430 and 1435. At step 1425, a request to join an authorized agency device to the incident response session may be transmitted. For example, the video conference provider 310 may transmit a request to the authorized agency network 350 to join the incident response session. At step 1435, an authorized agency device may be joined to the incident response session. For example, the video conference provider 310 may join the authorized agency device 360 to the incident response session.

In some embodiments, the method 1400 may also include determining, by the video conference provider 310, a plurality of client devices 440a-400j associated with the incident response system 400 and joining, by the video conference provider 310, client devices 440a-440j to the incident response session. In some embodiments, the video conference provider 310 may determine a location of client devices 440a-440j within the incident response system 400 and transmit, to the authorized agency device 360, the location of the client devices 440a-440j. In some cases, the video conference provider 310 may generate a map of the location of the client devices 440a-440j and transmit the map to the authorized agency device 360. Optionally, the method 1400 may include transmitting, by the video conference provider 310, a message from the authorized agency device 360 to the client devices 440a-440j joined to the incident response session.

In another embodiment, the method 1400 may include granting, by the video conference provider 310, host controls for the incident response session to the authorized agency device 360 and transmitting, to the plurality of client devices 440a-440j, a notification, such as notification 706 that the authorized agency device 360 is the host of the incident response session. In some embodiments, the method 1400 may include receiving, from the authorized agency device 360, a request to join a second authorized agency device to the incident response session and joining, by the video conference provider 310, the second authorized agency device to the incident response session.

Optionally, the method 1400 may include receiving, from the authorized agency device 360, a request to create one or more breakout rooms for the incident response session, receiving, from the authorized agency device 360, an assignment of participants for each of the one or more breakout rooms, generating, by the video conference provider 310, the one or more breakout rooms, and joining, by the video conference provider 310, client devices based on the assignment of participants to a respective breakout room of the one or more breakout rooms as indicated by the authorized agency device 360.

In some embodiments, the method 1400 may include granting, by the video conference provider 310, host controls of the incident response session to the authorized agency device 360 and transmitting, by the video conference provider 310, a notification that the authorized agency device 360 is the host of the incident response session. The method 1400 may also include receiving, from the authorized agency device 360, a request to join a second authorized agency device to the incident response session, joining, by the video conference provider 310, the second authorized agency device to the incident response session, and transmitting, by the video conference provider 310, a notification of the presence of the second authorized agency device in the incident response session.

Optionally, the video conference provider 310 may receive a request to transfer host controls of the incident response session to a second authorized agency device. In such cases, the video conference provider 310 may transfer the host controls for the incident response session to the second authorized agency device. If the host controls are transferred to a second authorized agency device, the video conference provider 310 may update the notification to indicate that the second authorized agency device is the host of the incident response session.

Figure 15:
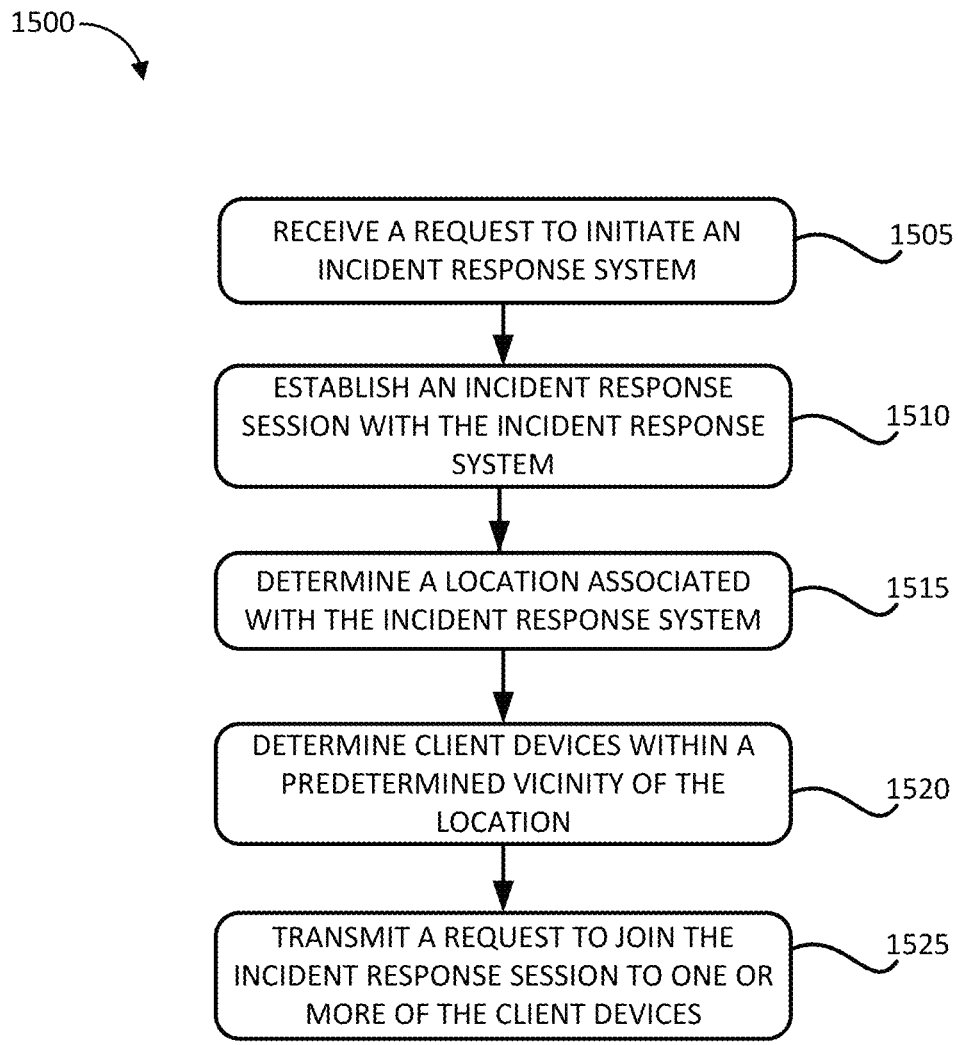
FIG. 15 illustrates an exemplary method for providing user location-based collaboration, according to an embodiment herein.

Referring now to FIG. 15, a flowchart of an example method 1500 for providing user location-based collaboration is provided, according to an embodiment herein. The description of the method 1500 in FIG. 15 will be made with reference to FIGS. 3-12, however any suitable system according to this disclosure may be used, such as the example systems 100 and 200, shown in FIGS. 1 and 2.

The method 1500 may include step 1505. At step 1505, a request to initiate an incident response system, such as the incident response system 400 or 500, may be received. The request may be received by a video conference provider, such as the video conference provider 310.

The method 1500 may also include steps 1510 and 1515. At step 1510, an incident response session may be established with the incident response system. For example, the video conference provider 310 may establish an incident response session with the incident response system 400. At step 1515, a location associated with the incident response system may be determined. For example, the video conference provider 310 may determine a location associated with the incident response system 400.

The method 1500 may also include steps 1520 and 1525. At step 1520, a plurality of client devices within a predetermined vicinity of the location may be determined. For example, the video conference provider 310 may determine a plurality of client devices 440a-440j within a predetermined vicinity of the location. An IP address, GPS data, or cellular network data associated with the incident response session 400 may be used to determine whether the client devices 440a-440j are within a predetermined vicinity. For example, the video conference provider 310 may identify a first client device having the IP address associated with the incident response system 400. At step 1525, a request to join the incident response session may be transmitted to the client devices. For example, the video conference provider 310 may transmit a request to join the incident response session to client devices 440a-440j. In some cases, along with the request to join the incident response session, the video conference provider 310 may transmit a notification that the first client device is requested to join the incident response session 400, where the notification includes a description of the incident response session, such as an indication configured to be displayed to a user of the first client device that by joining the incident response session the first client device grants control of equipment configured to generate one or more multimedia streams of the first client device to the video conference provider 310.

In some embodiments, the method 1500 may include joining, by the video conference provider 310, the first client device to the incident response session and receiving, by the video conference provider 310, a first multimedia stream from the first client device. Optionally, the method 1500 may include receiving, by the video conference provider 310, a request to control equipment corresponding to the first multimedia stream from the first client device, transmitting, by the video conference provider 310, a signal to the first client device to control the equipment corresponding to the first multimedia stream, and receiving, by the video conference provider 310, a modified first multimedia stream from the first client device based on the signal to control the equipment corresponding to the first multimedia stream.

In some embodiments, the method 1500 may also include transmitting, by the video conference provider 310, a request to join an authorized agency device 360 to the incident response session, and joining, by the video conference provider 310, the authorized agency device 360 to the incident response session. The method 1500 may also include receiving, by the video conference provider 310, one or more multimedia streams from each of the client devices 440a-440j joined to the incident response session and transmitting, to the authorized agency device 360, the one or more multimedia streams from each of the client devices 440a-440j joined to the incident response session. Optionally, the method 1500 may include transmitting a multimedia stream from the authorized agency device 360 to each of the client devices 440a-440j.

In some embodiments, the video conference provider 310 may receive a request for host controls over equipment of the client devices 440a-440j generating the one or more multimedia streams. The video conference provider 310 may grant the host controls over the equipment of the client devices 440a-440j for the authorized agency device 360. As discussed above, the host controls may allow the authorized agency device 360 to control the equipment of the one or more plurality of client devices 440a-440j generating the one or more multimedia streams.

In some embodiments, the method 1500 may include determining, by the video conference provider 310, a first location of a first client device of the client devices 440a-440j joined to the incident response session, determining, by the video conference provider 310, a second location of the first client device, and generating, by the video conference provider 310, a movement map of the first client device based on the first location and the second location of the first client device.

Optionally, the method 1500 may include receiving, from the authorized agency device 360, a request to control equipment corresponding to a first multimedia stream transmitted from the first client device based on the host controls, transmitting, by the video conference provider 310, a signal to the first client device to control the equipment corresponding to the first multimedia stream, and receiving, by the video conference provider 310, a modified first multimedia stream from the first client device based on the signal to control the equipment corresponding to the first multimedia stream. The signal to first client device to control the equipment corresponding to the first multimedia stream may include one or more of a request to activate a camera associated with the first client device, a request to activate a microphone associated with the first client device, a request to activate a speaker associated with the first client device, a request to increase a volume of an audio stream transmitted by the first client device, or a request to modify a video stream transmitted by the first client device.

Figure 16:
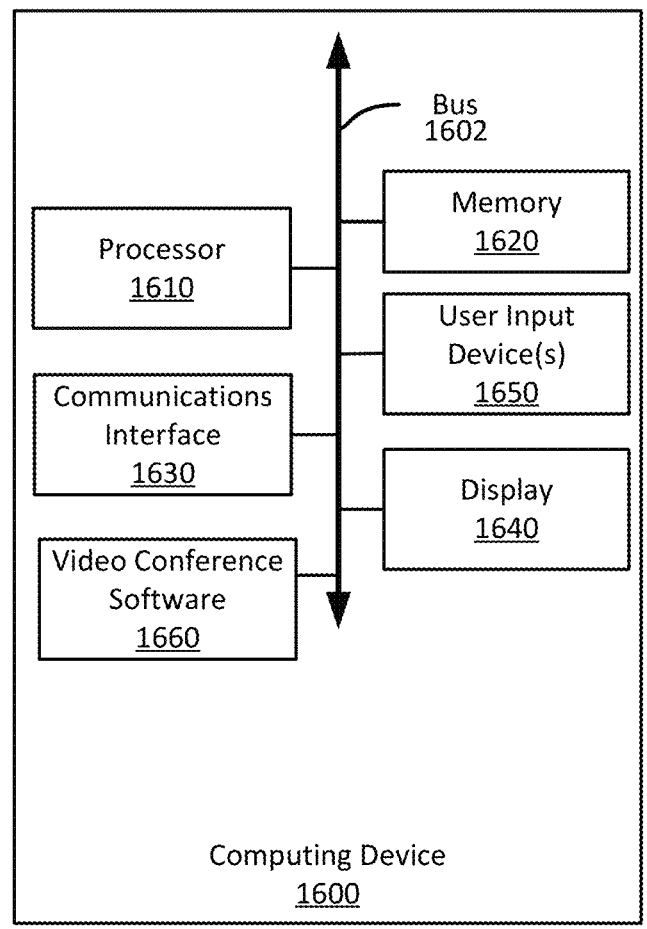
FIG. 16 shows an example computing device suitable for providing an incident response system, according to this disclosure.

Referring now to FIG. 16, FIG. 16 shows an example computing device 1600 suitable for use in example systems or methods providing an incident response system. The example computing device 1600 includes a processor 1610 which is in communication with the memory 1620 and other components of the computing device 1600 using one or more communications buses 1602. The processor 1610 is configured to execute processor-executable instructions stored in the memory 1620 to perform one or more methods for providing an incident response system, such as part or all of the example method 1300, described above with respect to FIG. 13, one or more methods for providing authorized agency system access, such as part of or all of the example method 1400, described above with respect to FIG. 14, or one or more methods for providing user location-based collaboration, such as part or all of the example method 1500, described above with respect to FIG. 15. The computing device, in this example, also includes one or more user input devices 1650, such as a keyboard, mouse, touchscreen, video input device (e.g., one or more cameras), microphone, etc., to accept user input. The computing device 1600 also includes a display 1640 to provide visual output to a user.

The computing device 1600 also includes a communications interface 1630. In some examples, the communications interface 1630 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Examples

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a method comprising: receiving, by a video conference provider, a request to initiate an incident response system; determining, by the video conference provider, a plurality of client devices associated with the incident response system; establishing, by the video conference provider, an incident response session with the incident response system; joining, by the video conference provider, one or more of the client devices to the incident response session; and transmitting, by the video conference provider, a request to join an authorized agency device to the incident response session.

Example 2 is the method of any previous or subsequent Example, wherein the request to initiate an incident response system is from an administrator of a facility where an incident event has occurred.

Example 3 is the method of any previous or subsequent Example, the method further comprising: joining, by the video conference provider, the authorized agency device to the incident response session; and generating, by the video conference provider, a notification of the presence of the authorized agency device in the incident response session.

Example 4 is the method of any previous or subsequent Example, the method further comprising: receiving, by the video conference provider, one or more multimedia streams from each of the one or more client devices joined to the incident response session; and transmitting, to the authorized agency device, the one or more multimedia streams to the incident response session.

Example 5 is the method of any previous or subsequent Example, the method further comprising: receiving, from the authorized agency device, a request for host controls over equipment of the one or more client devices generating the one or more multimedia streams; and granting, by the video conference provider, the host controls over the equipment of the one or more client devices for the authorized agency device.

Example 6 is the method of any previous or subsequent Example, the method further comprising: receiving, from the authorized agency device, a request to modify a first multimedia stream from a first client device of the one or more client devices; transmitting, by the video conference provider, a signal to the first client device to modify the first multimedia stream; receiving, by the video conference provider, a modified first multimedia stream from the first client device based on the signal to modify the first multimedia stream; and transmitting, to the authorized agency device, the modified first multimedia stream from the first client device.

Example 7 is the method of any previous or subsequent Example, the method further comprising: transmitting, by the video conference provider, a multimedia stream from the authorized agency device to each of the one or more client devices.

Example 8 is the method of any previous or subsequent Example, the method further comprising: receiving, from the authorized agency device, a request for an observation mode for the incident response session; and terminating, by the video conference provider, transmission of one or more multimedia streams from the authorized agency device to the one or more client devices.

Example 9 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: receive, by a video conference provider, a request to initiate an incident response system; determine, by the video conference provider, a plurality of client devices associated with the incident response system; establish, by the video conference provider, an incident response session with the incident response system; join, by the video conference provider, one or more of the plurality of client devices to the incident response session; and transmit, by the video conference provider, a request to join an authorized agency device to the incident response session.

Example 10 is the system of any previous or subsequent Example, wherein the processor is further configured to execute processor-executable instructions stored in the non-transitory computer-readable medium to: join, by the video conference provider, the authorized agency device to the incident response session; and responsive to joining the authorized agency device to the incident response session, granting, by the video conference provider, host controls to the authorized agency device for the incident response session.

Example 11 is the system of any previous or subsequent Example, wherein the processor is further configured to execute processor-executable instructions stored in the non-transitory computer-readable medium to: receive, by the video conference provider, one or more multimedia streams from each of the client devices joined to the incident response session; and transmit, to the authorized agency device, the one or more multimedia streams.

Example 12 is the system of any previous or subsequent Example, wherein the processor is further configured to execute processor-executable instructions stored in the non-transitory computer-readable medium to: receive, from the authorized agency device, an indication to modify a first multimedia stream of the one or more multimedia streams, wherein the first multimedia stream is received from a first client device; transmit, by the video conference provider, a signal to the first client device to modify the first multimedia stream; and receive, from the first client device, a modified first multimedia stream based on the signal to modify the first multimedia stream.

Example 13 is the system of any previous or subsequent Example, wherein the processor is further configured to execute processor-executable instructions stored in the non-transitory computer-readable medium to: identify, by the video conference provider, a first client device of the one or more client devices based on a first multimedia stream received from the first client device, wherein the first multimedia stream indicates an incident event within a vicinity of the first client device; and transmit, to the authorized agency device, a notification of the incident event within the vicinity of the first client device.

Example 14 is the system of any previous or subsequent Example, wherein the processor is further configured to execute processor-executable instructions stored in the non-transitory computer-readable medium to: receive, from the authorized agency device, a request to join a second authorized agency device to the incident response session; and join, by the video conference provider, the second authorized agency device to the incident response session.

Example 15 is the system of any previous or subsequent Example, wherein the processor is further configured to execute processor-executable instructions stored in the non-transitory computer-readable medium to: receive, from the authorized agency device, a request to grant secondary host controls to the second authorized agency device; and grant, by the video conference provider, secondary host controls to the second authorized agency device.

Example 16 is a non-transitory computer-readable medium comprising processor-executable instructions configured to cause one or more processors to: receive, by a video conference provider, a request to initiate an incident response system; determine, by the video conference provider, a plurality of client devices associated with the incident response system; establish, by the video conference provider, an incident response session with the incident response system; join, by the video conference provider, one or more of the plurality of client devices to the incident response session; and transmit, by the video conference provider, a request to join an authorized agency device to the incident response session.

Example 17 is the non-transitory computer-readable medium of any previous or subsequent Example, wherein the processor is further configured to execute processor-executable instructions stored in the non-transitory computer-readable medium to: join, by the video conference provider, the authorized agency device to the incident response session; and responsive to joining the authorized agency device to the incident response session, granting, by the video conference provider, host controls to the authorized agency device for the incident response session.

Example 18 is the non-transitory computer-readable medium of any previous or subsequent Example, wherein the processor is further configured to execute processor-executable instructions stored in the non-transitory computer-readable medium to: receive, from the authorized agency device, a request to receive one or more multimedia streams from a first client device of the one or more client devices joined to the incident response session; and transmit, to the authorized agency device, a first multimedia stream from the first client device.

Example 19 is the non-transitory computer-readable medium of any previous or subsequent Example, wherein the processor is further configured to execute processor-executable instructions stored in the non-transitory computer-readable medium to: receive, from the authorized agency device, a request to modify the first multimedia stream from the first client device; transmit, by the video conference provider, a signal to the first client device to modify the first multimedia stream; and receive, from the first client device, a modified first multimedia stream based on the signal to modify the first multimedia stream.

Example 20 is the non-transitory computer-readable medium of any previous or subsequent Example, wherein the signal to the first client device to modify the first multimedia stream comprises at least one of: a request to activate a camera associated with the first client device; a request to activate a microphone associated with the first client device; a request to activate a speaker associated with the first client device; a request to increase a volume of an audio stream transmitted by the first client device; or a request to modify a video stream transmitted by the first client device.

Example 21 is the non-transitory computer-readable medium of any previous or subsequent Example, wherein the processor is further configured to execute processor-executable instructions stored in the non-transitory computer-readable medium to: receive, from the authorized agency device, a request to create one or more breakout rooms for the incident response session; receive, from the authorized agency device, an assignment of participants for each of the one or more breakout rooms; generate, by the video conference provider, the one or more breakout rooms; and join, by the video conference provider, client devices based on the assignment of participants to a respective breakout room of the one or more breakout rooms as indicated by the authorized agency device.

Example 22 is a method comprising: receiving, by a video conference provider, a request to initiate an incident response system; establishing, by the video conference provider, an incident response session with the incident response system; determining, by a video conference provider, an incident event associated with the incident response session; determining, by the video conference provider, an authorized agency based on the incident event; transmitting, to the authorized agency, a request to join the incident response session; and joining, by the video conference provider, an authorized agency device from the authorized agency to the incident response session.

Example 23 is the method of any previous or subsequent Example, wherein the request to initiate an incident response system is from an administrator of a facility where an incident event has occurred.

Example 24 is the method of any previous or subsequent Example, the method further comprising: determining, by the video conference provider, a plurality of client devices associated with the incident response system; and joining, by the video conference provider, one or more of the plurality of client devices to the incident response session.

Example 25 is the method of any previous or subsequent Example, the method further comprising: granting, by the video conference provider, host controls for the incident response session to the authorized agency device; and transmitting, to the one or more client devices, a notification that the authorized agency device is the host of the incident response session.

Example 26 is the method of any previous or subsequent Example, the method further comprising: transmitting, by the video conference provider, a message from the authorized agency device to the one or more client devices joined to the incident response session.

Example 27 is the method of any previous or subsequent Example, the method further comprising: receiving, from the authorized agency device, a request to create one or more breakout rooms for the incident response session; receiving, from the authorized agency device, an assignment of participants for each of the one or more breakout rooms; generating, by the video conference provider, the one or more breakout rooms; and joining, by the video conference provider, client devices based on the assignment of participants to a respective breakout room of the one or more breakout rooms as indicated by the authorized agency device.

Example 28 is the method of any previous or subsequent Example, wherein determining, by the video conference provider, the authorized agency based on the incident event further comprises determining, by the video conference provider, the authorized agency based on a location of the incident response system.

Example 29 is the method of any previous or subsequent Example, the method further comprising: receiving, from the authorized agency device, a request to join a second authorized agency device to the incident response session; and joining, by the video conference provider, the second authorized agency device to the incident response session.

Example 30 is the method of any previous or subsequent Example, wherein the second authorized agency device corresponds to a second authorized agency that is different from the authorized agency corresponding to the first authorized agency device, and the method further comprising: granting, by the video conference provider, host controls to the second authorized agency device based on predefined criteria for the second authorized agency having higher authority than the authorized agency.

Example 31 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: receive, by a video conference provider, a request to initiate an incident response system; establish, by the video conference provider, an incident response session with the incident response system; determine, by a video conference provider, an incident event associated with the incident response session; determine, by the video conference provider, an authorized agency based on the incident event; transmit, to the authorized agency, a request to join the incident response session; and join, by the video conference provider, an authorized agency device from the authorized agency to the incident response session.

Example 32 is the system of any previous or subsequent Example, wherein the processor is further configured to execute processor-executable instructions stored in the non-transitory computer-readable medium to: determine, by the video conference provider, a plurality of client devices associated with the incident response system; and join, by the video conference provider, one or more of the plurality of client devices to the incident response session.

Example 33 is the system of any previous or subsequent Example, wherein the processor is further configured to execute processor-executable instructions stored in the non-transitory computer-readable medium to: determine, by the video conference provider, a location of at least one of the client devices joined to the incident response system; and transmit, to the authorized agency device, the determined location.

Example 34 is the system of any previous or subsequent Example, wherein the processor is further configured to execute processor-executable instructions stored in the non-transitory computer-readable medium to: generate, by the video conference provider, a map of the location; and transmit, to the authorized agency device, the map of the location.

Example 35 is the system of any previous or subsequent Example, wherein the processor is further configured to execute processor-executable instructions stored in the non-transitory computer-readable medium to: grant, by the video conference provider, host controls of the incident response session to the authorized agency device; and transmit, by the video conference provider, a notification that the authorized agency device is the host of the incident response session.

Example 36 is the system of any previous or subsequent Example, wherein the processor is further configured to execute processor-executable instructions stored in the non-transitory computer-readable medium to: receive, from the authorized agency device, a request to transfer host control of the incident response session to a second authorized agency device; and transfer, by the video conference provider, the host controls for the incident response session from the authorized agency device to the second authorized agency device.

Example 37 is the system of any previous or subsequent Example, wherein the processor is further configured to execute processor-executable instructions stored in the non-transitory computer-readable medium to: update, by the video conference provider, the notification to indicate that the second authorized agency device is the host of the incident response session.

Example 38 is a non-transitory computer-readable medium comprising processor-executable instructions configured to cause one or more processors to: receive, by a video conference provider, a request to initiate an incident response system; establish, by the video conference provider, an incident response session with the incident response system; determine, by a video conference provider, an incident event associated with the incident response session; determine, by the video conference provider, an authorized agency based on the incident event; transmit, to the authorized agency, a request to join the incident response session; and join, by the video conference provider, an authorized agency device from the authorized agency to the incident response session.

Example 39 is the non-transitory computer-readable medium of any previous or subsequent Example, wherein the processor is further configured to execute processor-executable instructions stored in the non-transitory computer-readable medium to: determine, by the video conference provider, a plurality of client devices associated with the incident response system; and join, by the video conference provider, one or more of the client devices to the incident response session.

Example 40 is the non-transitory computer-readable medium of any previous or subsequent Example, wherein the processor is further configured to execute processor-executable instructions stored in the non-transitory computer-readable medium to: receive, by the video conference provider, one or more multimedia streams from each of the one or more plurality of client devices joined to the incident response session; and transmit, to the authorized agency device, the one or more multimedia streams from each of the one or more plurality of client devices joined to the incident response session.

Example 41 is the non-transitory computer-readable medium of any previous or subsequent Example, wherein the processor is further configured to execute processor-executable instructions stored in the non-transitory computer-readable medium to: grant, by the video conference provider, host controls of the incident response session to the authorized agency device, wherein the host controls allow the authorized agency device to control the one or more multimedia streams received from each of the one or more plurality of client devices joined to the incident response session.

Example 42 is the non-transitory computer-readable medium of any previous or subsequent Example, wherein the processor is further configured to execute processor-executable instructions stored in the non-transitory computer-readable medium to: receive, from the authorized agency device, a request for observation mode for the incident response session; and terminate, by the video conference provider, transmission of one or more multimedia streams from the authorized agency device to the one or more plurality of client devices.

Example 43 is the non-transitory computer-readable medium of any previous or subsequent Example, wherein the processor is further configured to execute processor-executable instructions stored in the non-transitory computer-readable medium to: receive, from the authorized agency device, a request to join a second authorized agency device to the incident response session; join, by the video conference provider, the second authorized agency device to the incident response session; and transmit, by the video conference provider, a notification of the presence of the second authorized agency device in the incident response session.

Example 44 is a method comprising: receiving, by a video conference provider, a request to initiate an incident response system; establishing, by the video conference provider, an incident response session with the incident response system; determining, by the video conference provider, a location associated with the incident response system; determining, by the video conference provider, a plurality of client devices within a predetermined vicinity of the location; and transmitting, by the video conference provider, a request to one or more of the client devices to join the incident response session.

Example 45 is the method of any previous or subsequent Example, wherein the request to initiate an incident response system is from an administrator of a facility where an incident event has occurred.

Example 46 is the method of any previous or subsequent Example, the method further comprising: transmitting, by the video conference provider, a request to join an authorized agency device to the incident response session; and joining, by the video conference provider, the authorized agency device to the incident response session.

Example 47 is the method of any previous or subsequent Example, the method further comprising: receiving, by the video conference provider, one or more multimedia streams from each of the client devices joined to the incident response session; and transmitting, to the authorized agency device, the one or more multimedia streams.

Example 48 is the method of any previous or subsequent Example, wherein determining, by the video conference provider, a plurality of client devices within a predetermined vicinity of the location further comprises: determining, by the video conference provider, an IP address associated with the incident response system; and identifying, by the video conference provider, a first client device having the IP address as being within the predetermined vicinity of the location.

Example 49 is the method of any previous or subsequent Example, wherein transmitting, by the video conference provider, the request to join the incident response session further comprises: transmitting, to the first client device, a notification that the first client device is requested to join the incident response system, the notification comprising a description of the incident response session, wherein the description comprises an indication configured to be displayed to a user of the first client device that by joining the incident response session the first client device grants control of equipment configured to generate one or more multimedia streams of the first client device to the video conference provider.

Example 50 is the method of any previous or subsequent Example, the method further comprising: joining, by the video conference provider, the first client device to the incident response session; and receiving, by the video conference provider, a first multimedia stream from the first client device.

Example 51 is the method of any previous or subsequent Example, the method further comprising: receiving, by the video conference provider, a request to control equipment of the first client device corresponding to the first multimedia stream; transmitting, by the video conference provider, a signal to the first client device to control the equipment corresponding to the first multimedia stream; and receiving, by the video conference provider, a modified first multimedia stream from the first client device based on the signal to control the equipment corresponding to the first multimedia stream.

Example 52 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: receive, by a video conference provider, a request to initiate an incident response system; establish, by the video conference provider, an incident response session with the incident response system; determine, by the video conference provider, a location associated with the incident response system; determine, by the video conference provider, a plurality of client devices within a predetermined vicinity of the location; and transmit, by the video conference provider, a request to one or more of the client devices to join the incident response session.

Example 53 is the system of any previous or subsequent Example, wherein the instructions to determine the plurality of client devices within the predetermined vicinity of the location further cause the processor to execute further processor-executable instructions stored in the non-transitory computer-readable medium to determine the location of the client devices based on one or more of: an IP address; global position system (GPS) data; and cellular network data.

Example 54 is the system of any previous or subsequent Example, wherein the processor is further configured to execute processor-executable instructions stored in the non-transitory computer-readable medium to: join, by the video conference provider, an authorized agency device to the incident response session; and generate, by the video conference provider, a notification of the presence of the authorized agency device in the incident response session.

Example 55 is the system of any previous or subsequent Example, wherein the instructions to transmit, by the video conference provider, the request to join the incident response session further cause the processor to execute further processor-executable instructions stored in the non-transitory computer-readable medium to: transmit, by the video conference provider, a message from the authorized agency device to the one or more client devices.

Example 56 is the system of any previous or subsequent Example, wherein the processor is further configured to execute processor-executable instructions stored in the non-transitory computer-readable medium to: join, by the video conference provider, an authorized agency device to the incident response session; receive, by the video conference provider, one or more multimedia streams from each of the one or more client devices joined to the incident response session; and transmit, to the authorized agency device, the one or more multimedia streams.

Example 57 is the system of any previous or subsequent Example, wherein the processor is further configured to execute processor-executable instructions stored in the non-transitory computer-readable medium to: determine, by the video conference provider, a location for each of the one or more client devices joined to the incident response session; and generate, by the video conference provider, a map of the location of each of the one or more client devices joined to the incident response session.

Example 58 is the system of any previous or subsequent Example, wherein the processor is further configured to execute processor-executable instructions stored in the non-transitory computer-readable medium to: determine, by the video conference provider, a first location of a first client device of the one or more client devices joined to the incident response session; determine, by the video conference provider, a second location of the first client device; and generate, by the video conference provider, a movement map of the first client device based on the first location and the second location of the first client device.

Example 59 is a non-transitory computer-readable medium comprising processor-executable instructions configured to cause one or more processors to: receive, by a video conference provider, a request to initiate an incident response system; establish, by the video conference provider, an incident response session with the incident response system; determine, by the video conference provider, a location associated with the incident response system; determine, by the video conference provider, a plurality of client devices within a predetermined vicinity of the location; and transmit, by the video conference provider, a request to one or more client devices to join the incident response session.

Example 60 is the non-transitory computer-readable medium of any previous or subsequent Example, wherein the processor is further configured to execute processor-executable instructions stored in the non-transitory computer-readable medium to: transmit, by the video conference provider, a request to join an authorized agency device to the incident response session; and join, by the video conference provider, the authorized agency device to the incident response session.

Example 61 is the non-transitory computer-readable medium of any previous or subsequent Example, wherein the processor is further configured to execute processor-executable instructions stored in the non-transitory computer-readable medium to: determine, by the video conference provider, a location for each of the one or more client devices joined to the incident response session; and transmit, to the authorized agency device, the location for each of the one or more client devices joined to the incident response session.

Example 62 is the non-transitory computer-readable medium of any previous or subsequent Example, wherein the processor is further configured to execute processor-executable instructions stored in the non-transitory computer-readable medium to: receive, by the video conference provider, a request from the authorized agency device to receive host controls over a first client device of the one or more client devices based on the location of the first client device; and grant, by the video conference provider, the host controls over the first client device to the authorized agency device.

Example 63 is the non-transitory computer-readable medium of any previous or subsequent Example, wherein the processor is further configured to execute processor-executable instructions stored in the non-transitory computer-readable medium to: receive, from the authorized agency device, a request to control equipment corresponding to a first multimedia stream transmitted from the first client device based on the host controls; transmit, by the video conference provider, a signal to the first client device to control the equipment corresponding to the first multimedia stream; and receive, by the video conference provider, a modified first multimedia stream from the first client device based on the signal to control the equipment corresponding to the first multimedia stream.

Example 64 is the non-transitory computer-readable medium of any previous or subsequent Example, wherein the signal to the first client device to control the equipment corresponding to the first multimedia stream comprises at least one of: a request to activate a camera associated with the first client device; a request to activate a microphone associated with the first client device; a request to activate a speaker associated with the first client device; a request to increase a volume of an audio stream transmitted by the first client device; or a request to modify a video stream transmitted by the first client device.

That which is claimed is:

1. A method comprising:
   receiving, by a video conference provider, a request to initiate an incident response system associated with a facility, the incident response system comprising a plurality of client devices installed within the facility, each client device of the plurality of client devices registered as part of the incident response system and having an installed video conferencing client application;
   establishing, by the video conference provider, an incident response session video conference;
   determining, by the video conference provider, a location of an incident event at the facility associated with the incident response system;
   determining, by the video conference provider, a subset of the plurality of client devices within the facility and within a predetermined vicinity of the location to capture audio or video streams of the incident; and
   transmitting, by the video conference provider, a request to one or more of the client devices of the subset of client devices to autonomously join the incident response session using the installed video conferencing application.

2. The method of claim 1, wherein the request to initiate an incident response system is from an administrator of a facility where the incident event has occurred.

3. The method of claim 1, the method further comprising:
   transmitting, by the video conference provider, a request to join an authorized agency device to the incident response session; and
   joining, by the video conference provider, the authorized agency device to the incident response session.

4. The method of claim 1, wherein determining, by the video conference provider, a plurality of client devices within a predetermined vicinity of the location further comprises:
   determining, by the video conference provider, an IP address associated with the incident response system; and
   identifying, by the video conference provider, a first client device having the IP address as being within the predetermined vicinity of the location.

5. The method of claim 4, wherein transmitting, by the video conference provider, the request to join the incident response session further comprises:
   transmitting, to the first client device, a notification that the first client device is requested to join the incident response system, the notification comprising a description of the incident response session, wherein the description comprises an indication configured to be displayed to a user of the first client device that by joining the incident response session the first client device grants control of equipment configured to generate one or more multimedia streams of the first client device to the video conference provider.

6. The method of claim 4, the method further comprising:
   joining, by the video conference provider, the first client device to the incident response session; and receiving, by the video conference provider, a first multimedia stream from the first client device.

7. The method of claim 5, the method further comprising:
receiving, by the video conference provider, a request to control equipment of the first client device corresponding to the first multimedia stream;
transmitting, by the video conference provider, a signal to the first client device to control the equipment corresponding to the first multimedia stream; and
receiving, by the video conference provider, a modified first multimedia stream from the first client device based on the signal to control the equipment corresponding to the first multimedia stream.

8. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:
receive, by a video conference provider, a request to initiate an incident response system associated with a facility;
establish, by the video conference provider, an incident response session with the incident response system;
determine, by the video conference provider, a location of an incident event at the facility associated with the incident response system;
determine, by the video conference provider, a plurality of client devices within the facility and within a predetermined vicinity of the location; and
transmit, by the video conference provider, a request to one or more of the client devices to join the incident response session.

9. The system of claim 8, wherein the instructions to determine the plurality of client devices within the facility and within the predetermined vicinity of the location further cause the processor to execute further processor-executable instructions stored in the non-transitory computer-readable medium to determine the location of the client devices based on one or more of:
an IP address;
global position system (GPS) data; and
cellular network data.

10. The system of claim 8, wherein the processor is further configured to execute processor-executable instructions stored in the non-transitory computer-readable medium to:
join, by the video conference provider, an authorized agency device to the incident response session; and
generate, by the video conference provider, a notification of the presence of the authorized agency device in the incident response session.

11. The system of claim 10, wherein the instructions to transmit, by the video conference provider, the request to join the incident response session further cause the processor to execute further processor-executable instructions stored in the non-transitory computer-readable medium to:
transmit, by the video conference provider, a message from the authorized agency device to the one or more client devices.

12. The system of claim 8, wherein the processor is further configured to execute processor-executable instructions stored in the non-transitory computer-readable medium to:
join, by the video conference provider, an authorized agency device to the incident response session;
receive, by the video conference provider, one or more multimedia streams from each of the one or more client devices joined to the incident response session; and
transmit, to the authorized agency device, the one or more multimedia streams.

13. The system of claim 8, wherein the processor is further configured to execute processor-executable instructions stored in the non-transitory computer-readable medium to:
determine, by the video conference provider, a location for each of the one or more client devices joined to the incident response session; and
generate, by the video conference provider, a map of the location of each of the one or more client devices joined to the incident response session.

14. The system of claim 8, wherein the processor is further configured to execute processor-executable instructions stored in the non-transitory computer-readable medium to:
determine, by the video conference provider, a first location of a first client device of the one or more client devices joined to the incident response session;
determine, by the video conference provider, a second location of the first client device; and
generate, by the video conference provider, a movement map of the first client device based on the first location and the second location of the first client device.

15. A non-transitory computer-readable medium comprising processor-executable instructions configured to cause one or more processors to:
receive, by a video conference provider, a request to initiate an incident response system associated with a facility;
establish, by the video conference provider, an incident response session with the incident response system;
determine, by the video conference provider, a location of an incident event at the facility associated with the incident response system;
determine, by the video conference provider, a plurality of client devices within the facility and within a predetermined vicinity of the location; and
transmit, by the video conference provider, a request to one or more client devices to join the incident response session.

16. The non-transitory computer-readable medium of claim 15, wherein the processor is further configured to execute processor-executable instructions stored in the non-transitory computer-readable medium to:
transmit, by the video conference provider, a request to join an authorized agency device to the incident response session; and
join, by the video conference provider, the authorized agency device to the incident response session.

17. The non-transitory computer-readable medium of claim 16, wherein the processor is further configured to execute processor-executable instructions stored in the non-transitory computer-readable medium to:
determine, by the video conference provider, a location for each of the one or more client devices joined to the incident response session; and
transmit, to the authorized agency device, the location for each of the one or more client devices joined to the incident response session.

18. The non-transitory computer-readable medium of claim 17, wherein the processor is further configured to execute processor-executable instructions stored in the non-transitory computer-readable medium to:
  receive, by the video conference provider, a request from the authorized agency device to receive host controls over a first client device of the one or more client devices based on the location of the first client device; and
  grant, by the video conference provider, the host controls over the first client device to the authorized agency device.

19. The non-transitory computer-readable medium of claim 18, wherein the processor is further configured to execute processor-executable instructions stored in the non-transitory computer-readable medium to:
  receive, from the authorized agency device, a request to control equipment corresponding to a first multimedia stream transmitted from the first client device based on the host controls;
  transmit, by the video conference provider, a signal to the first client device to control the equipment corresponding to the first multimedia stream; and
  receive, by the video conference provider, a modified first multimedia stream from the first client device based on the signal to control the equipment corresponding to the first multimedia stream.

20. The non-transitory computer-readable medium of claim 19, wherein the signal to the first client device to control the equipment corresponding to the first multimedia stream comprises at least one of:
  a request to activate a camera associated with the first client device;
  a request to activate a microphone associated with the first client device;
  a request to activate a speaker associated with the first client device;
  a request to increase a volume of an audio stream transmitted by the first client device; or
  a request to modify a video stream transmitted by the first client device.

* * * * *